June 7, 1960 P. M. G. TOULON ET AL 2,939,909

TELEVISION SYSTEM

Filed July 6, 1955 11 Sheets-Sheet 1

Fig. I.

INVENTORS
Pierre M. G. Toulon &
Francis T. Thompson
BY F. E. Browder
ATTORNEY

June 7, 1960 P. M. G. TOULON ET AL 2,939,909

TELEVISION SYSTEM

Filed July 6, 1955 11 Sheets-Sheet 4

| CODING SYSTEM | | | | |
|---|---|---|---|---|
| Group | Average of Brightness of Group | High Definition Brightness Level | Large or Small Dot Display | Voltage Steps |
| 1 | Black | B | L | 1 |
| | | | | 2 |
| 2 | Dark Gray | B | S | 3 |
| 2 | " " | DG | S | 4 |
| 2 | " " | DG | L | 5 |
| 2 | " " | MG | S | 6 |
| 2 | " " | LG | S | 7 |
| 2 | " " | W | S | 8 |
| | | | | 9 |
| 3 | Medium Gray | B | S | 10 |
| 3 | " " | DG | S | 11 |
| 3 | " " | MG | L | 12 |
| 3 | " " | MG | S | 13 |
| 3 | " " | LG | S | 14 |
| 3 | " " | W | S | 15 |
| | | | | 16 |
| 4 | Light Gray | B | S | 17 |
| 4 | " " | DG | S | 18 |
| 4 | " " | MG | S | 19 |
| 4 | " " | LG | L | 20 |
| 4 | " " | LG | S | 21 |
| 4 | " " | W | S | 22 |
| | | | | 23 |
| 5 | White | W | L | 24 |

June 7, 1960 P. M. G. TOULON ET AL 2,939,909

TELEVISION SYSTEM

Filed July 6, 1955 11 Sheets-Sheet 5

June 7, 1960 P. M. G. TOULON ET AL 2,939,909

TELEVISION SYSTEM

Filed July 6, 1955 11 Sheets-Sheet 9

June 7, 1960 P. M. G. TOULON ET AL 2,939,909

TELEVISION SYSTEM

Filed July 6, 1955 11 Sheets-Sheet 11

2,939,909

TELEVISION SYSTEM

Pierre M. G. Toulon, Turtle Creek, and Francis T. Thompson, Pittsburgh, Pa., assignors to Westinghouse Electric Corporation, East Pittsburgh, Pa., a corporation of Pennsylvania Filed July 6, 1955, Ser. No. 520,176
11 Claims. (Cl. 178—6.8)

This invention relates to the transmission, reception and reproduction of electrical communication signals and more particularly to television image signals.

The principal object of this invention is to reduce the width of the frequency band required for the transmission of electrical signals or to increase the definition of a television image with a given bandwidth.

The television system utilized in the United States is comprised of 525 horizontal lines scanned 30 times a second and the video bandwidth is limited to 4.25 megacycles per second. Rather than transmit 30 images per second, which would produce objectionable flicker, it was decided to scan twice as many images per second with half the number of lines per image and thus retain the bandwidth of 4.25 megacycles per second. The present system calls for the odd number lines to be scanned in one sixtieth of a second called a field and the even number lines scanned in the next field in one sixtieth of a second so that a complete frame (two fields) of 525 lines is scanned in one thirtieth of a second. This method of scanning is known as vertical interlace and is utilized in the system adopted in the United States.

The bandwidth of 4.25 megacycles per second limits the number of resolvable elements of definition presented along each of the horizontal scanning lines to about 450 assuming an 83% active horizontal scanning time. This results from the fact that the bandwidth of 4.25 megacycles is equal to the horizontal lines scanned per field (262½) times the fields scanned per second (60) times half the elements per each horizontal scanned line (450/2) multiplied by the per unit active horizontal scanning time (.83). In order to reduce the bandwidth with the same definition or to increase the definition with the same bandwidth, it is necessary that one of the determining factors of bandwidth be modified.

In comparison with successive-line frame scanning in which each field contains the total number of lines, the conventional two field vertical interlace allows better utilization of video information and is a first step in the reduction of the bandwidth. To attempt to further decrease the lines per field and still retain the 525 lines per frame and 60 fields per second would result in flicker due to the short decay time of presently used phosphors. However, the physiological factor of the human eye can be utilized to further reduce bandwidth without loss of definition. It has been found that where the reproduced scene is of low detail in shade or where rapid movement is involved, the observer requires less definition.

It has also been found that a horizontal interlace system may be utilized whereby a plurality of dots are presented along one horizontal line in one field and then in a later field the area between the dots of the first field are presented so as to form essentially a dot interlace along each horizontal line. The horizontal dot interlace system in combination with present vertical interlace requires at least four fields to complete a frame and may utilize even a larger number. The horizontal interlace system also suffers from the same problem associated with the vertical interlace in that where more than two fields per frame are utilized objectionable flicker may be encountered due to the short decay time of the present phosphors.

A cathode ray tube in which a horizontally and vertically interlaced picture may be presented with a minimum of flicker forms the subject matter of copending U.S. patent application of Pierre M. G. Toulon and Francis T. Thompson, Serial No. 490,026, filed February 23, 1955, entitled "Image Reproducing Device" now Patent No. 2,921,211, issued January 12, 1960.

In the television system disclosed in the above-referred to copending application, use is made of interlaced dots to reduce the bandwidth required for transmitting a television image. In one embodiment disclosed, eight fields are required to complete a picture on the eight sets of dots or picture elements. The position and order of presentation of these picture elements produces 7.5 and 15 cycle flickers when vertical bars are displayed. Hence, the picture which would be displayed on a conventional television receiver would not be entirely satisfactory.

It is, accordingly, a primary object of our invention to provide improved high definition television systems and methods which are suitable for the presentation of an image using present monochrome and color television receivers.

It is another object to provide improved high definition television systems and methods which are suitable for the presentation of an image using present monochrome television receivers.

It is another object to provide an improved television system and method for transmitting and receiving television picture images in natural colors.

It is another object to provide an improved television system to combine the advantages of horizontal and vertical interlace scanning to reduce the required bandwidth for a suitable high definition image.

It is another object to provide an improved television system to present a high definition image to an observer with a given bandwidth.

It is another object to provide an improved scanning system for television by which to increase the definition of a reproduced image.

It is another object to provide an improved scanning system for television by which to increase the definition of a reproduced image without increasing the transmission bandwidth.

It is another object to provide an improved television system which utilizes a low definition and a high definition scan within a television raster.

It is another object to provide an improved television system which restricts any flicker in a reproduced television image to small picture areas.

It is another object to provide an improved television system which reduces the structure of a reproduced television image in large areas of the picture.

It is another object to provide a television system which makes an analysis of the redundancies in video information between adjacent picture elements in a given frame and/or between corresponding elements in successive frames.

It is another object to form and transmit a signal concerning these redundancies in a compatible manner.

It is another object to recover the redundancy information from this signal at the receiver.

It is another object to provide a means to use this redundancy signal at the receiver to select a phosphor of the proper time decay for displaying each video information.

It is another object to provide means to use this redundancy signal at the receiver to alter the spot size used for displaying each video information.

It is another object to provide a signal from the transmitter which allows the selection of the desired light producing area at the receiver.

It is another object to provide means to use this redundancy signal at the receiver to select the type of video information used for reproducing the televised image.

It is another object to provide an improved television system capable of reproducing an image on a cathode ray tube screen having different decay time light producing elements.

It is another object to provide an improved television system capable of reproducing an image on a display device having light producing elements that emit light for different lengths of time.

It is another object to provide a high definition television system capable of reproducing an image on a cathode ray tube screen having different phosphor areas capable of producing light of the component image colors when excited by electron beam energy.

It is another object to quantize the video information representing the brightness information in a scene to be televised into a predetermined number of quantum levels and to form and transmit a signal representative of the brightness of the scene televised and representative of the redundancies existing in the video information.

It is another object to recover the brightness information and the redundancy information from this signal at the receiver.

These and other objects are effected by our invention as will be apparent from the following description taken in accordance with the accompanying drawings throughout which like reference characters indicate like parts, and in which.

Figure 1:
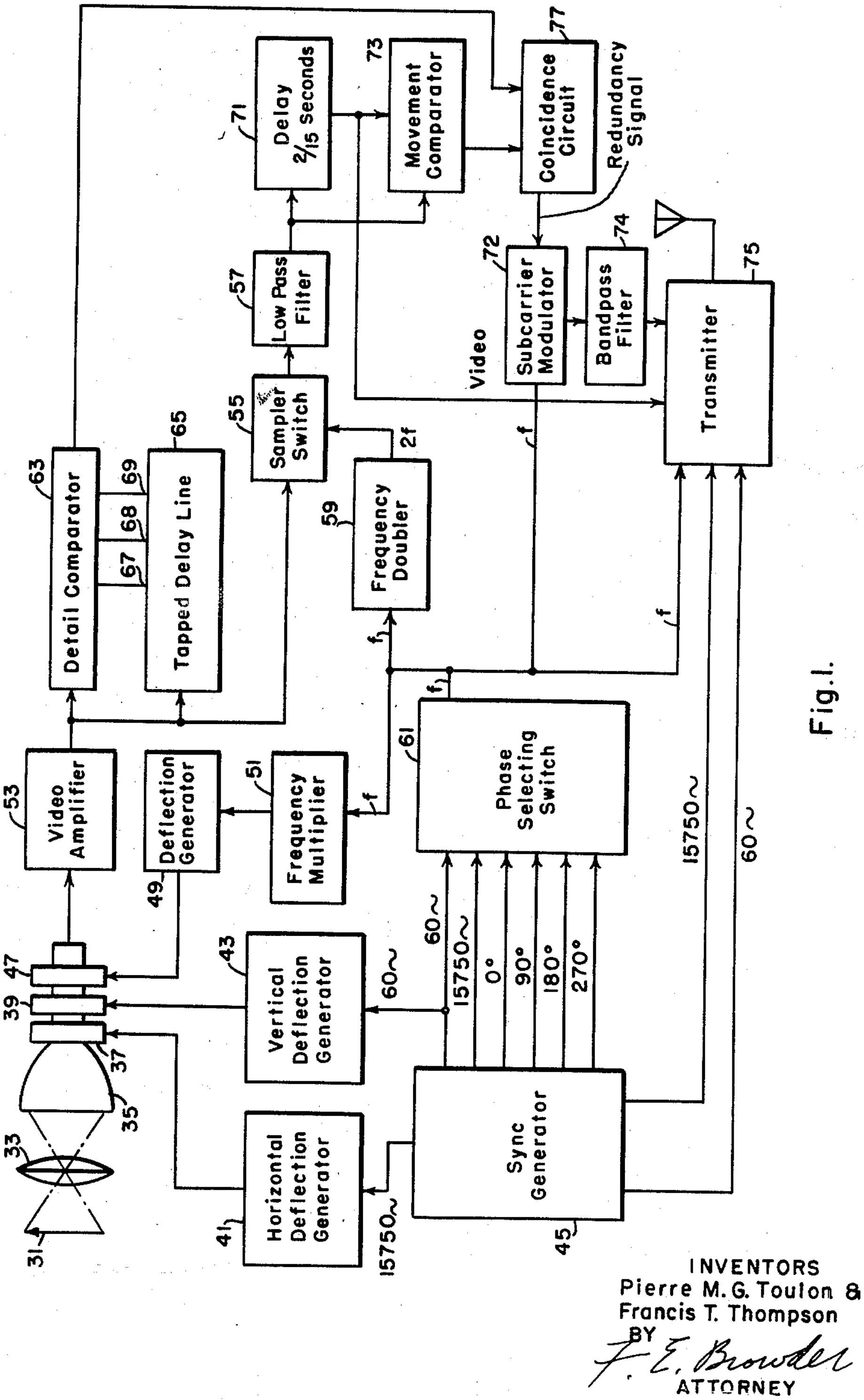
Figure 1 is a block diagram of a television transmission system embodying our invention.
Figure 3:
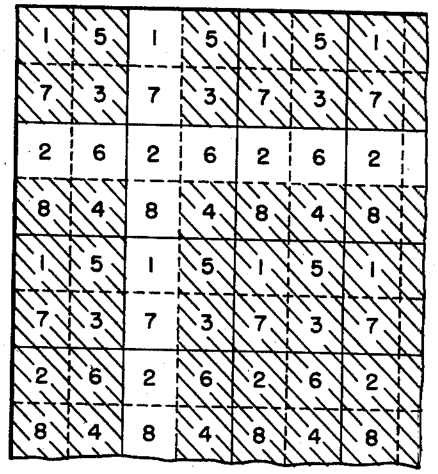
Figure 4A:
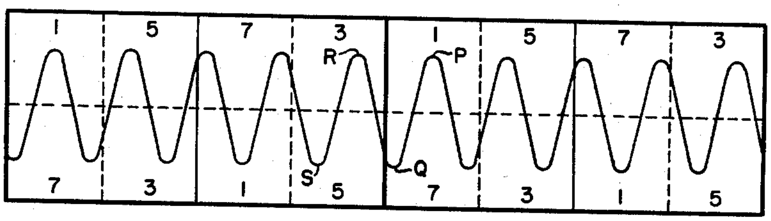

Fig. 3 is a graphical illustration, for purposes of explaining the invention, of a portion of the faceplate of the pickup tube as shown in our above-reference U.S. patent application, entitled "Image Reproducing Device." The faceplate of the pickup tube has superimposed picture elements or areas thereon and also bright vertical and horizontal bars displayed on a dark background superimposed on the picture element;

Fig. 4A is a graphical illustration showing a portion of the faceplate of the pickup tube in Fig. 1 with superimposed picture elements thereon and also showing the path of scanning used in the system shown in Fig. 1 during field one of the eight-field frame.

Figure 4B:
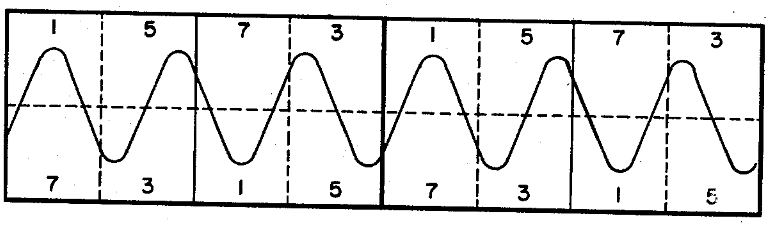

Fig. 4B is a graphical illustration similar to Fig. 4A showing a modification of the path of scanning that may be used in the system shown in Fig. 1 during field one of the eight-field frame.

Figure 4C:
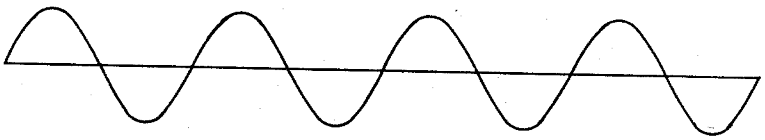
Figure 4D:
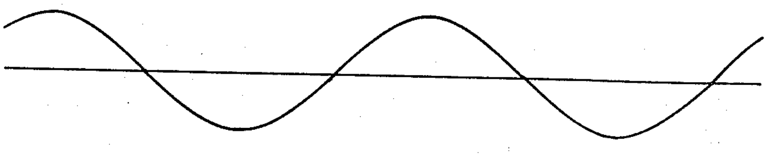
Figure 5:
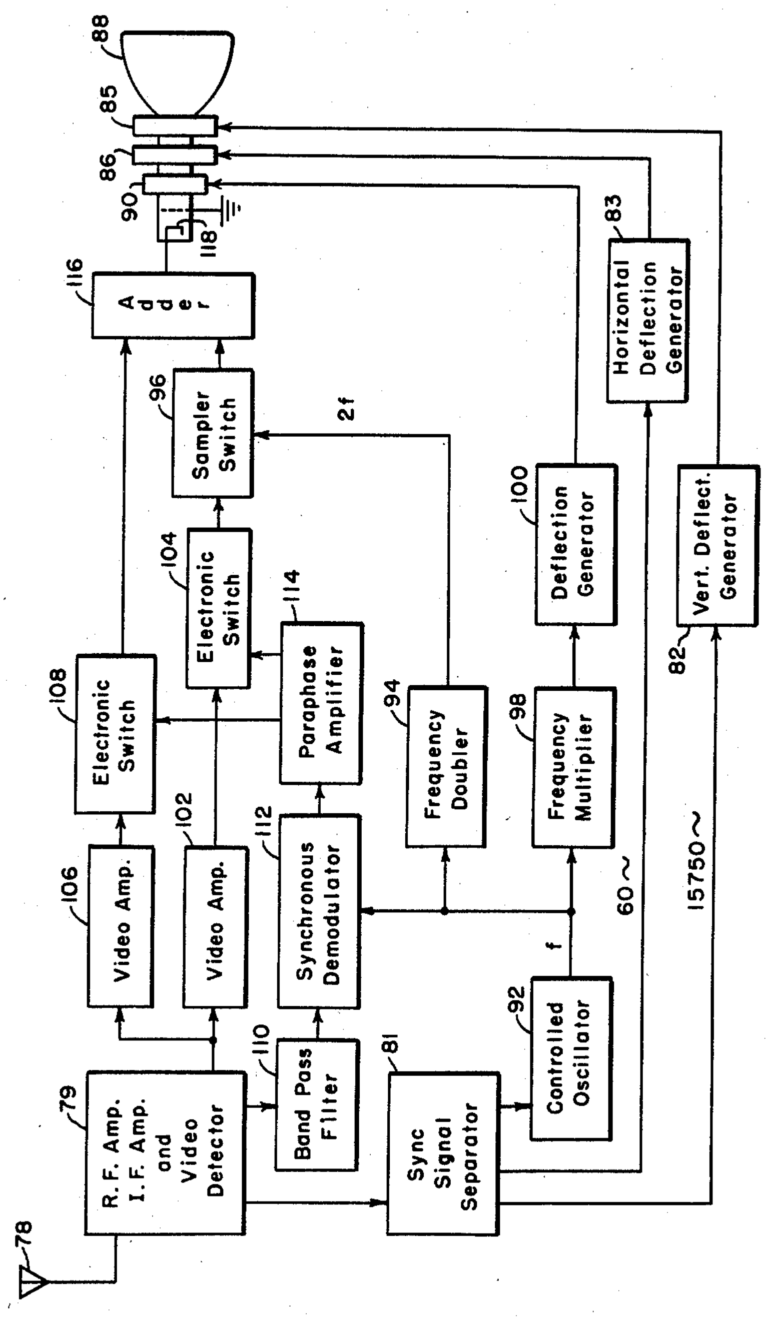
Figures 6, 8:
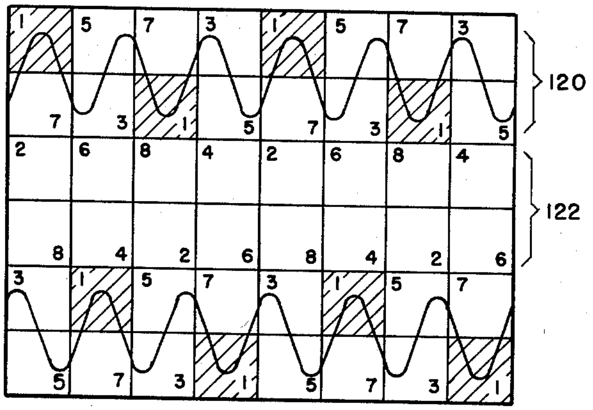
Figure 7:
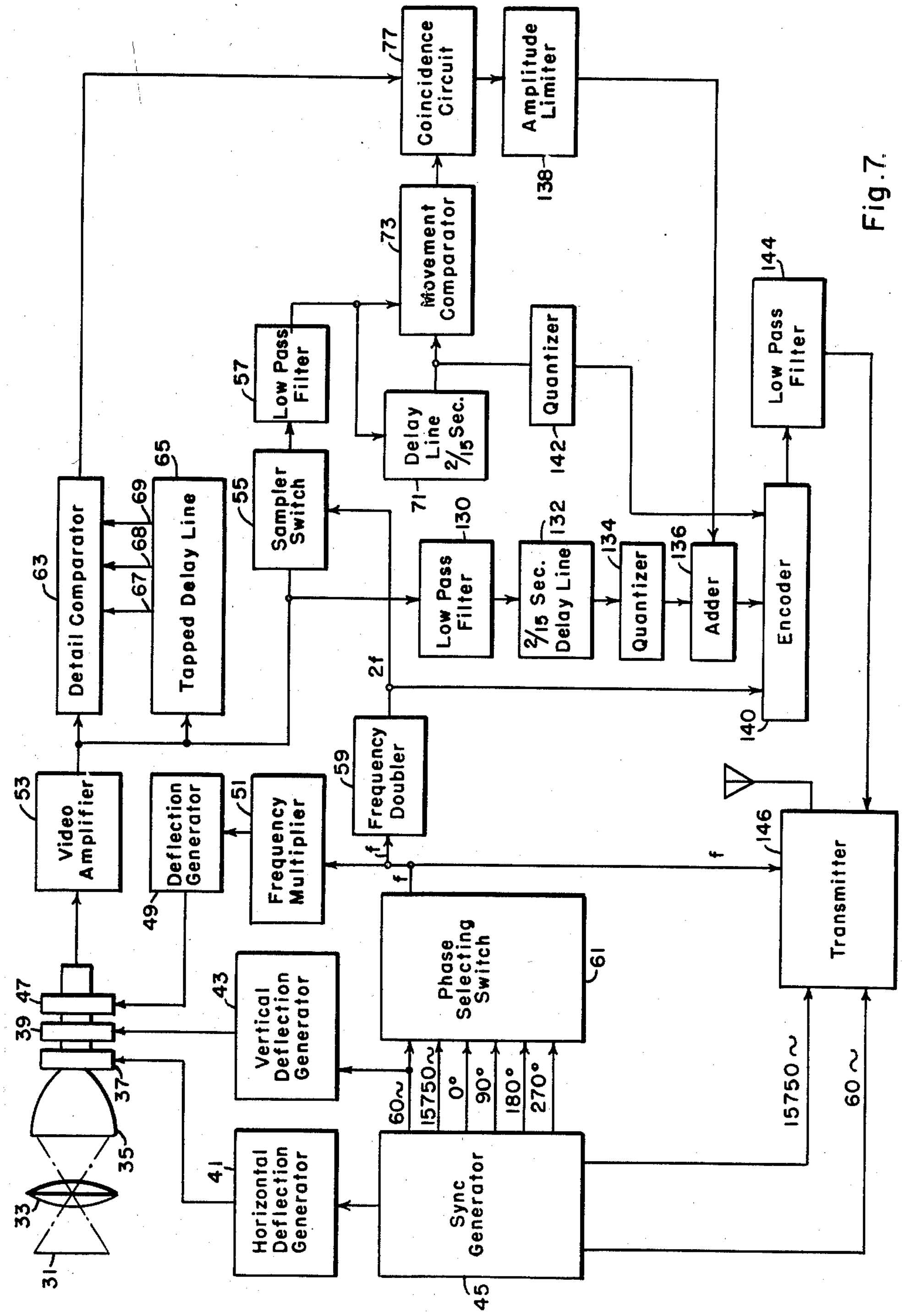
Figure 9:
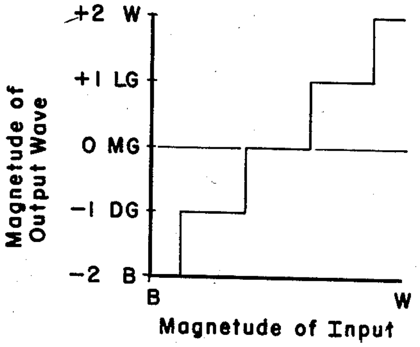
Figure 10:
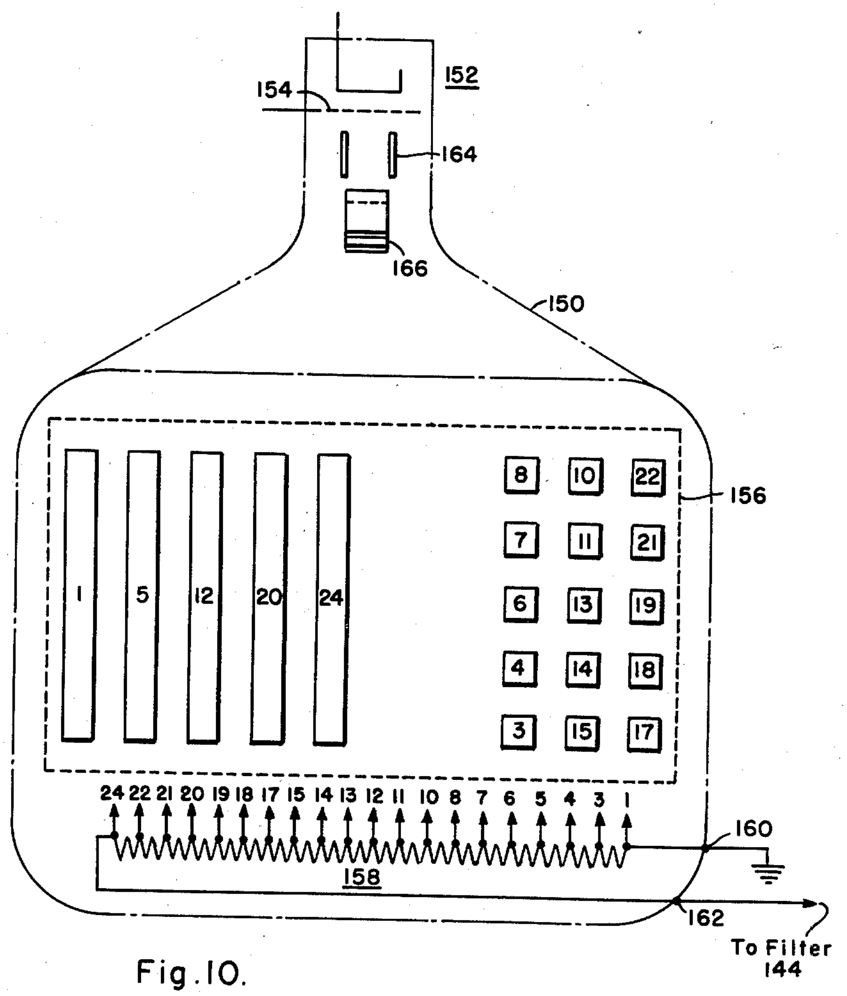
Figure 11:
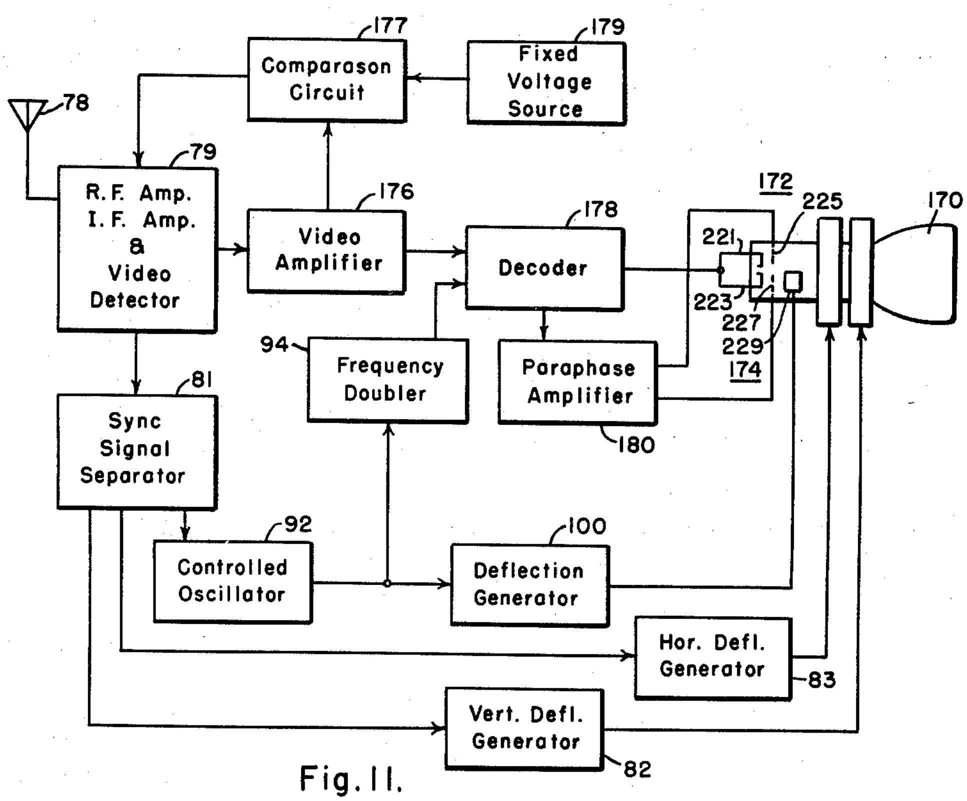
Figure 13:
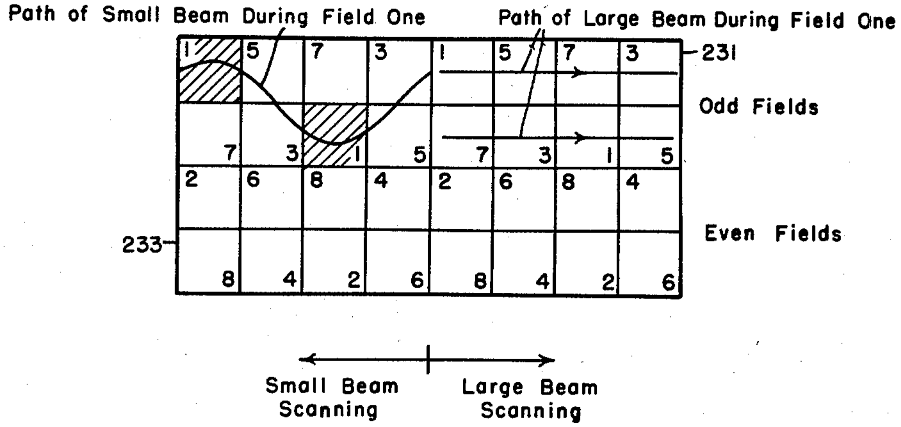
Figure 12:
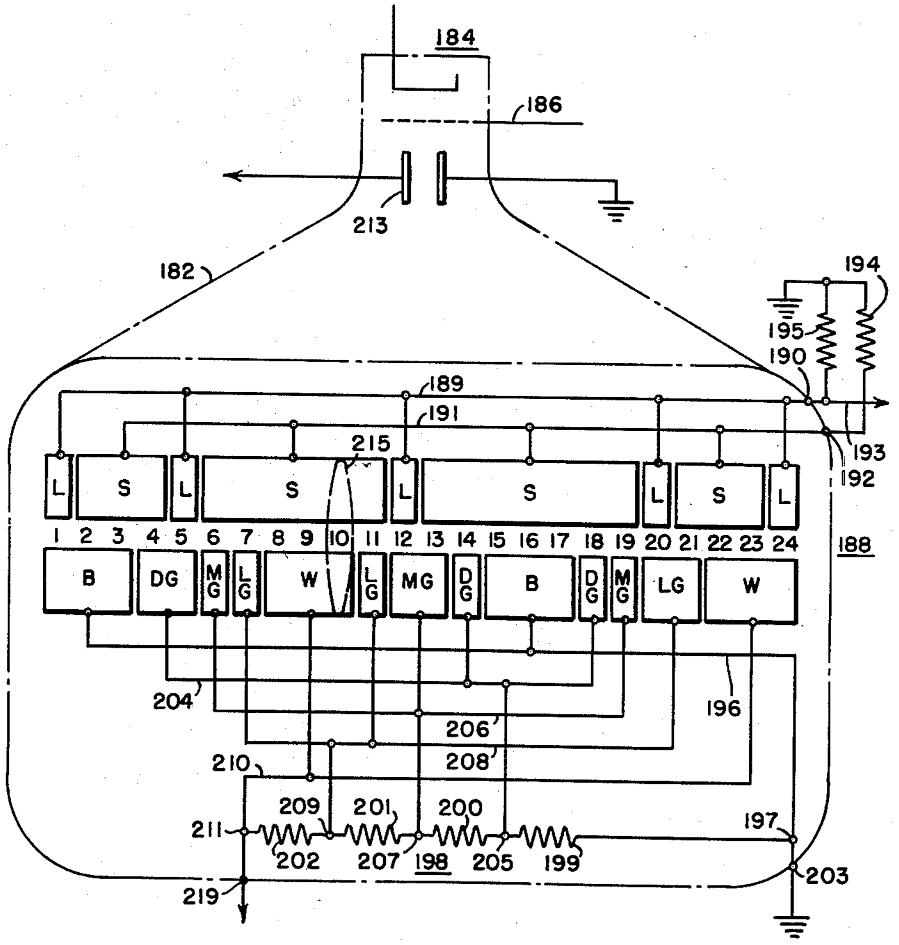
Figure 14:
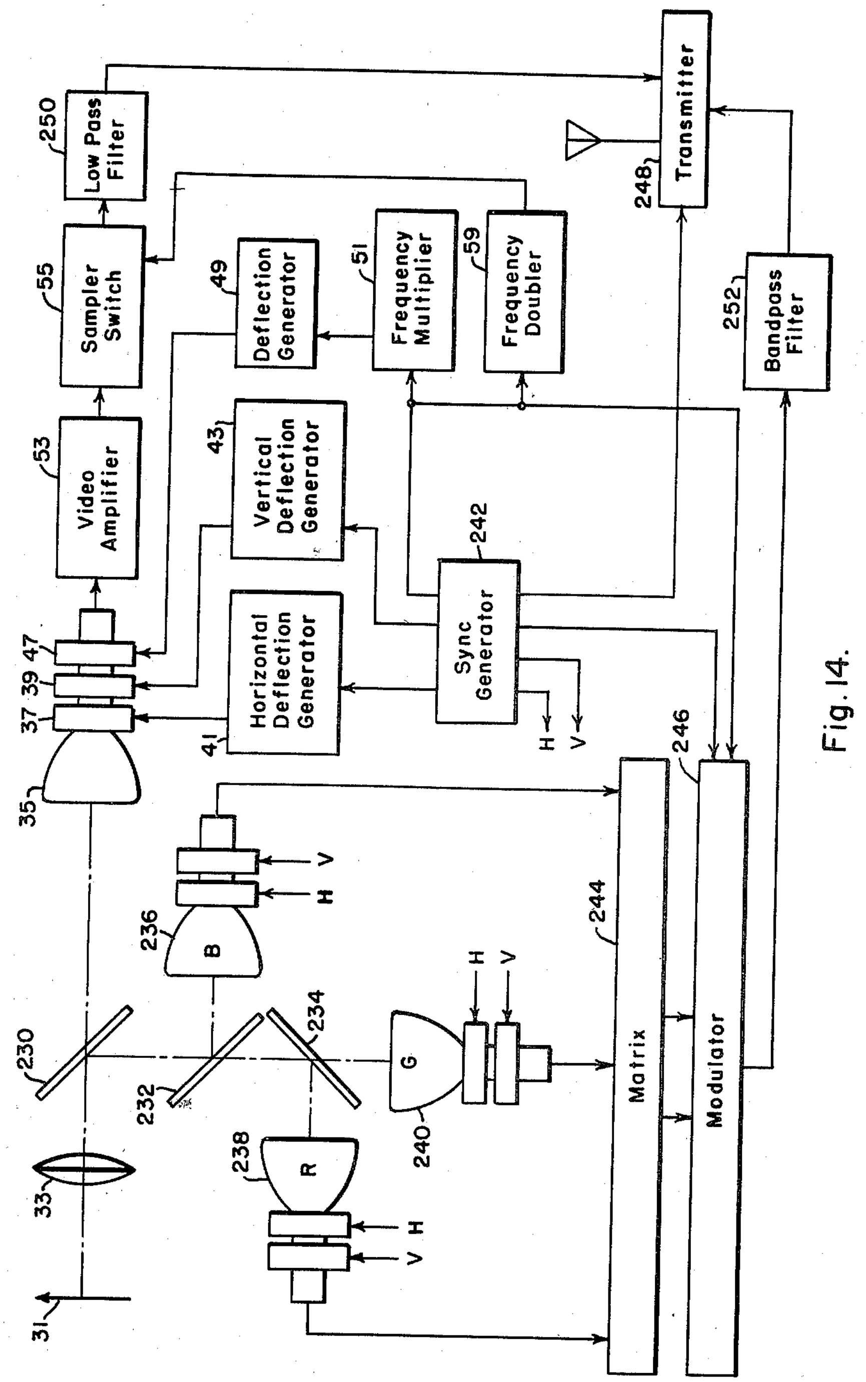
Figure 15:
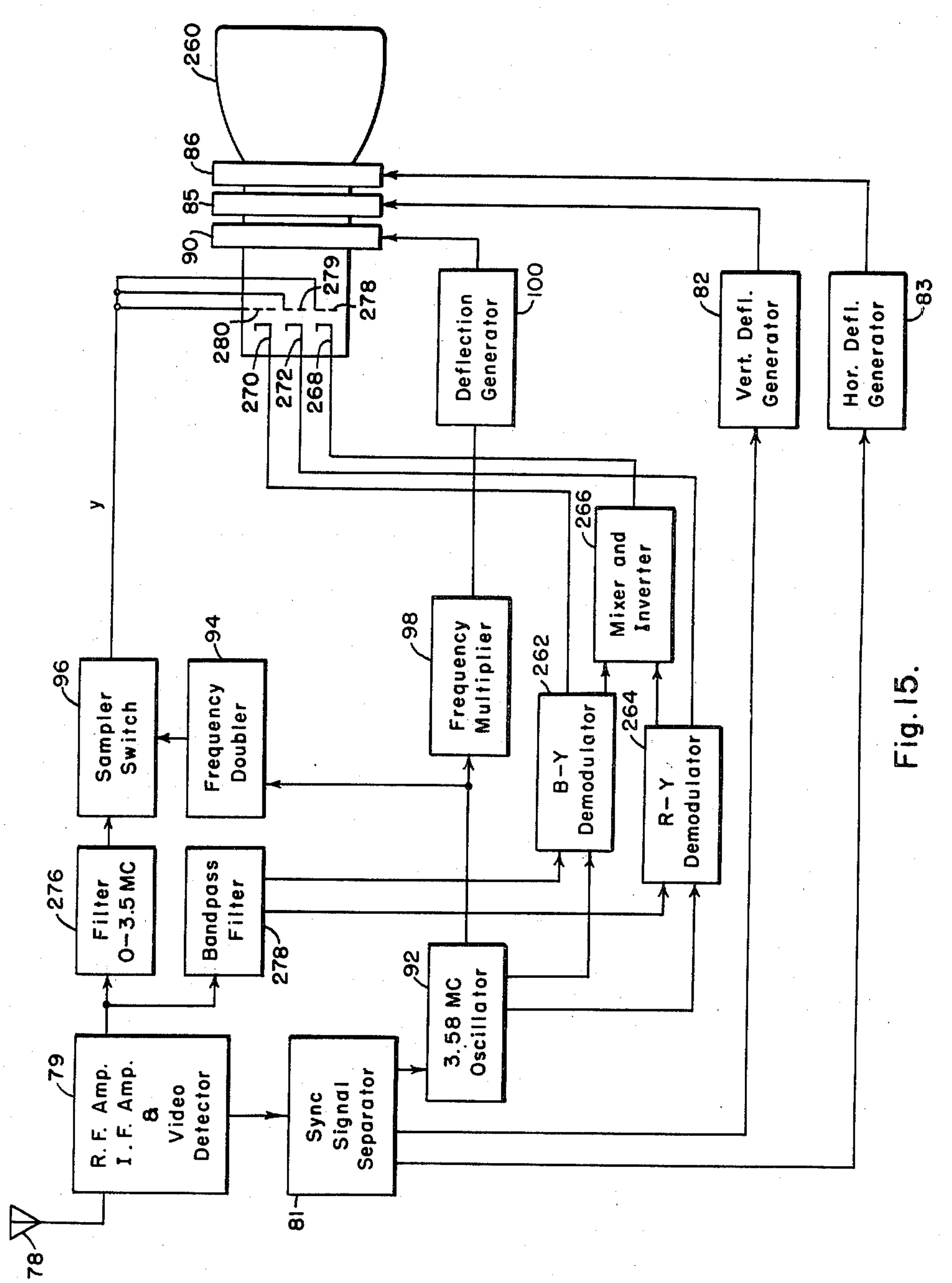
Figure 16:
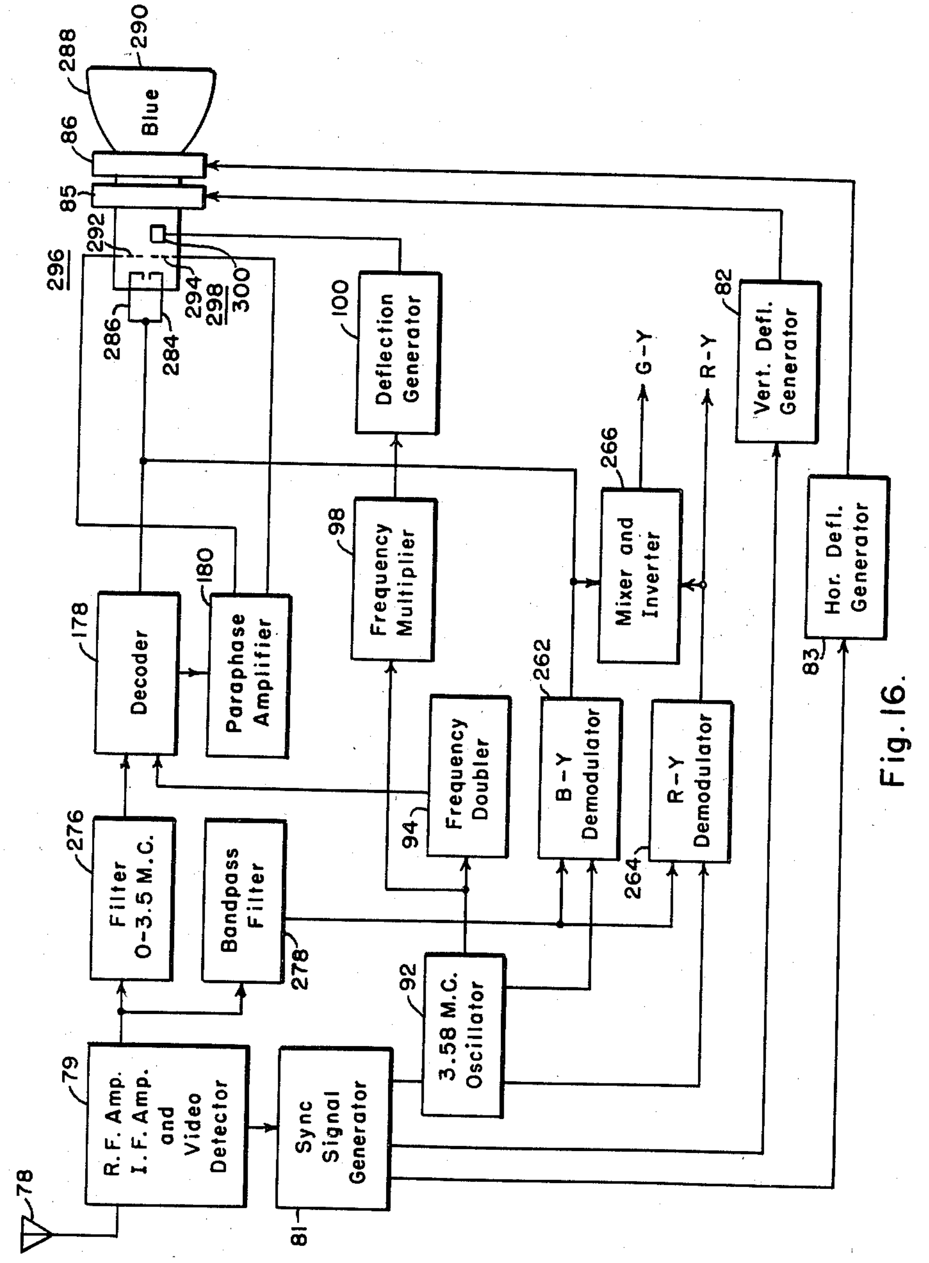

Fig. 4C is an illustration showing an electrical waveform which will be referred to in analyzing and explaining the invention;

Fig. 4D is an illustration of another electrical waveform which will be referred to in analyzing and explaining the invention;

Fig. 5 is a block diagram of a television receiving system embodying our invention;

Fig. 6 is a graphical illustration showing a portion of the faceplate of the cathode ray tube of Fig. 5 with superimposed picture elements and beam trace areas;

Fig. 7 is a block diagram of another television transmission system embodying our invention;

Fig. 8 illustrates graphically one possible breakdown or coding of the video signal transmitted using the transmission system of Fig. 7;

Fig. 9 is a graphical representation illustrating the quantizing characteristic of the quantizers utilized in Fig. 7;

Fig. 10 illustrates a suitable encoder applicable to the transmission system of Fig. 7;

Fig. 11 is a block diagram of a television receiver system adapted to receive the video signal radiated by the transmission system of Fig. 7 and to reproduce the transmitted image;

Fig. 12 illustrates a suitable decoder applicable to the receiver system of Fig. 11;

Fig. 13 is a graphical illustration showing a portion of the faceplate of the cathode ray tube of Fig. 11 with superimposed picture elements and beam trace areas;

Fig. 14 is a block diagram of a color television transmission system embodying our invention;

Fig. 15 is a block diagram of a color television receiver system adapted to receive the video signal radiated by the transmission system of Fig. 14 and to reproduce the transmitted image; and Fig. 16 is a block diagram of another color television receiver system adapted to receive a composite color signal, the brightness portion of which is transmitted in a manner similar to that shown in the transmission system of Fig. 7 and the color portion of which is transmitted on a subcarrier in a manner similar to the color part of the transmission system of Fig. 14.

Referring to Fig. 1 in detail, there is illustrated a television transmitting system embodying our invention. The light from an object or scene 31 is focused by suitable optical means 33 onto the photosensitive cathode of a suitable television camera tube 35. The camera tube 35 herein is of the well known orthicon type. It will become evident to those skilled in the art that other types of camera tubes may be employed in the practice of this invention with equal facility.

The camera tube 35 is provided with the usual deflection system in the form of horizontal and vertical deflection coils 37 and 39. The horizontal deflection coil 37 is provided with a horizontal deflection generator 41 of suitable type and driven at a frequency of 15,750 cycles per second. The vertical deflection coil 39 is provided with a suitable deflection generator 43 driven at a frequency of 60 cycles per second.

The horizontal and vertical deflection generators 41 and 43 are controlled by separate sync signals provided from a synchronizing signal generator 45.

In addition to the usual deflection system, an auxiliary coil 47 is provided around the neck of the camera tube 35 which is connected to a deflection generator 49 which is in turn connected to a frequency multiplier 51.

Figure 2:
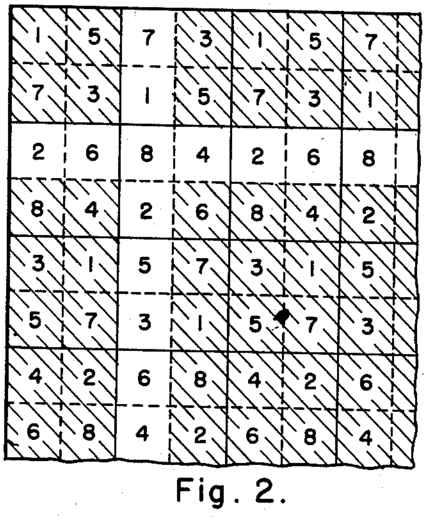
Fig. 2 is a graphical illustration, for purposes of explaining the invention, of the faceplate of the pickup tube in Fig. 1 with superimposed picture elements or areas thereon and also bright vertical and horizontal bars displayed on a dark background superimposed on the picture elements.

In Fig. 2, a portion of the raster scanned by the camera tube 35 is shown. The raster is divided into eight sets of picture elements. The number designated on each of the elements on the raster corresponds to the field in which the video information from this particular element is obtained by means of the recording electron beam. In order to obtain a 4:1 vertical and a 2:1 horizontal interlace, it is necessary that eight fields be scanned to complete one frame. Thus, during field one of the eight-field frame, video information is obtained from all of the elements labeled 1 in Fig. 2. During field two of the eight-field cycle or frame, the video information is obtained from all of the elements labeled 2. The remaining information to complete a frame is obtained from the other elements in a similar manner during the remaining six fields.

Fig. 3 shows the position and order of presentation of the picture elements as described in our copending application previously referred to. This order of presentation of the picture elements produces 7.5 or 15 cycle flickers, when vertical or horizontal bars are displayed. The reason for this is illustrated in Fig. 3 which shows these bright vertical and horizontal bars on a dark background superimposed on the picture elements. The horizontal bar is excited only during fields 2 and 6 or once every 1/15 of a second. The vertical bar is excited in fields 1, 2, 7 and 8, which produces a 7.5 cycle flicker since the bar is excited during consecutive fields 7, 8, 1 and 2 and is not excited during fields 3, 4, 5 and 6. This order of presentation causes samples to be shifted together in a vertical or horizontal direction in order to reach the desired picture elements. The picture on a conventional television receiver would shift vertically and horizontally at 7.5 and 15 cycles per second rates, respectively, if this sampling pattern was used in a high definition television transmitter.

In Fig. 2, there is also shown vertical and horizontal bright bars on a dark background superimposed on the picture elements. The rate of excitation of a bar is increased by staggering the elements which are displayed in any given field so that the picture elements are not arranged in a straight line as shown in Fig. 3. The excitation rate for the horizontal bar has been doubled since it is now excited during fields 2, 4, 6 and 8. The vertical bar is excited during all eight fields, which represents the ideal condition. The sampling pattern of Fig. 2 provides for an improved television system since the picture elements excited in a single field are staggered and their average position does not shift from field to field. It is thus seen that by exciting interleaved parts of these vertical and horizontal bars at a higher rate any flicker is confined to local areas rather than resulting in the bars appearing and disappearing. In any event, the local flicker is not serious due to the large statistical brightness correlation between adjacent picture elements.

In order to scan the staggered or interleaved picture elements in Fig. 2, a vertical sinusoidal displacement or wobble is added to the standard scan. In Figs. 4A and 4B, a portion of an odd interlaced line from a portion of the faceplate of the pickup tube 35 is shown. The repeating portions of this line are outlined by heavy lines and are called groups for purposes of explaining the invention. The group repetition frequency corresponds to the maximum video frequency to be transmitted and is equal to 4 megacycles per second. The group repetition frequency is chosen to equal 4 megacycles per second in order to make the system compatible. But it will be obvious that the group repetition frequency may assume other frequency values without departing from the teachings of our invention. A video sampling frequency equal to 8 megacycles per second is used in the system illustrated in Fig. 1. A vertical displacement or wobble frequency equal to $4n$ megacycles per second is used, where $n$ is an odd integer. This frequency of $4n$ megacycles per second is required to reach the staggered picture elements that are selected in a given field. The case where $n$ is equal to 5 is shown in Fig. 4A, while the case where $n$ is equal to 3 is shown in Fig. 4B. It is seen that the phase of the waveforms shown is correct for field one of the eight-field cycle and is chosen so that the peaks of the wobble sinusoid are centered in the number one picture elements. The video from the number one elements is sampled at the peaks of the sampling sinusoid which is phased as shown in Fig. 4C. The burst sinusoid shown in Fig. 4D has a phase so that its positive peaks coincide with the upper number one picture elements in Figs. 4A and 4B, while its negative peaks coincide with the lower number one elements.

Returning to Fig. 1, the frequency multiplier 51 will produce a frequency of 20 megacycles per second. The wave shape of the frequency multiplier 51 is sinusodial. The output of the frequency multiplier 51 is used to synchronize the deflection generator 49. The output of the deflection generator 49 is connected to the auxiliary deflection coil 47 which allows a raster to be scanned in the manner shown in Fig. 4A. If the output of frequency multiplier 51 was of a frequency of 12 megacycles per second, the raster scanned would be like that shown in Fig. 4B.

The output of the camera tube 35 is fed to a video ampilifier 53, and the output thereof is fed to a sampler switch 55, which is a high speed electronic switch. The sampler switch 55, a suitable type of which is described at pages 505 and 520, Television engineering, by Donald G. Fink published by McGraw-Hill Book Co., 2nd Edition, may be thought of as a rotary switch rotating at 8 million revolutions per second. This switch 55 allows the video information from the video amplifier 53 to pass to a low pass filter 57 during $\theta$ degrees of rotation and permits no video information to pass during the other 360-$\theta$ degrees. The angle $\theta$ is chosen to be small enough so that information is obtained from a single small picture element during each cycle.

The frequency and phase of the sampler switch 55 is controlled by an 8 megacycle per second signal fed to it from a frequency doubler 59 which in turn is fed a 4 megacycle per second signal from a phase selecting switch 61. The phase selecting switch 61 consists of a synchronized switch, such as described in the previously mentioned reference Television Engineering, by Fink at pages 505 and 520. The sync generator 45 also supplies, to phase selecting switch 61, four equal amplitude signals of a frequency of 4 megacycles per second, differing in phase by 0°, 90°, 180° and 270°. The phase selecting switch 61 connects one of these 4 megacycle per second signals to the frequency multiplier 51 and the frequency doubler 59. The phase selecting switch 61 is synchronized by a 15,750 cycle per second signal and a 60 cycle per second signal from the sync generator 45 so that the output signal of the phase selecting switch 61 will be of correct phase for each entire field. It is thus apparent that waveforms such as those shown in Figs. 4A–4D will have the correct phase for each field of the eight-field cycle so that the peaks of the wobble sinusoid are centered in the correct picture elements.

The purpose of the sampler switch 55, the frequency doubler 59 and the phase selecting switch 61 is to provide a 2:1 horizontal dot interlace scan while the purpose of the auxiliary coil 47, deflection generator 49, and the frequency multiplier 51 is to add a vertical sinusoidal undulation to the standard scan to increase the vertical interlace to a ratio of 4:1.

Automatic dot interlacing may be obtained and the phase selecting switch 61 may be eliminated if a frequency which is an odd multiple of one-quarter the line scanning frequency of the electron beam is chosen to directly feed the frequency multiplier 51 and the frequency doubler 59.

The output of video amplifier 53 is also fed to a detail comparator 63 and also through a tapped delay line 65 to the detail comparator 63. For purposes of explaining the invention, let us assume that a wobble frequency equal to 20 megacycles per second is used. The path of scanning will then correspond to that shown in Fig. 4A. In this event, the delay line 65 consists of three cascaded sections, each having a delay of 1/40 microsecond. The output taps 67, 68 and 69 of the three cascaded sections of the delay line 65 are fed to the detail comparator 63. If the video obtained from the video amplifier 53 and fed to the detail comparator 63 corresponds to the brightness at point P of Fig. 4A, then at the output taps 67, 68 and 69 the video information will correspond to the image brightness at points Q, R and S.

To explain the function of the detail comparator 63, let us assume that field number one is being scanned and that the video information obtained from the video amplifier 53 and fed directly to the detail comparator 63 at this given instant of time is obtained from element 1 in Fig. 4. This video information corresponds to the brightness at point P. The video information at the output taps 67, 68 and 69 at this same instant of time will correspond to the brightness at points Q, R and S. The video information components at the output taps 67, 68 and 69 are obtained from the adjacent elemental areas which will be sampled during fields 7, 3 and 5 respectively. The video information from the output taps 67, 68 and 69 and the video information from the video amplifier 53 are simultaneously fed into the detail comparator 63. The detail comparator 63 consists of three differential amplifiers as described at pages 57–58 and 357–359, "Waveforms," First Edition, by Chance, Hughes, et al., published by McGraw-Hill Book Co. These three differential amplifiers perform the operation of subtracting the video intelligence fed directly to the detail comparator 63 from the video intelligence at the output tap 69, from the video intelligence at the output tap 68, and from the video intelligence at the output tap 67, respectively. An output is thus obtained from the detail comparator 63 only if a difference other than zero is obtained from any of the differential amplifiers. A zero output from the detail comparator 63 indicates that the video values obtained from the elements 1, 3, 5 and 7 are identical. An output from the detail comparator 63 indicates that one or more of the elements 7, 5 or 3 differs from element 1 and, therefore, that there is high detail information present in the scanned portion of the raster represented by the four elements 1, 3, 5 and 7 in the center of Fig. 4.

The low-pass filter 57 has a bandpass of 0 to 4 megacycles per second. The output of the lowpass filter 57, consisting of an envelope of sampled video from the sampler switch 55, is fed through a delay line 71 to a movement comparator 73. The output of the filter 57 is also fed directly to the movement comparator 73. The delay line 71 has an exact eight-field or $\frac{2}{15}$ second delay and a bandwidth of 4 megacycles. This delay may be alternately obtained by synchronizing a video tape recorder such as described in an article entitled "A System of Recording and Reproducing Television Signals" by Olson et al. appearing in the March 1954 issue of the R.C.A. Review using the methods described in an article entitled "Synchronization of Multiplex Systems for Recording Video Signals on Magnetic Tape" by D. E. Maxwell and W. P. Bentley appearing in the 1955 Convention Record of the I.R.E. This delay may also be obtained by utilizing a storage device capable of storing signals formed during one frame or by using the method utilizing motion picture film set forth on page 36 of our previously referenced U.S. patent application, Serial No. 490,026, entitled "Image Reproducing Device." The movement comparator 73 functions in a similar manner to the detail comparator 63 and compares the video signal derived from the low-pass filter 57 with the output of the delay line 71. The video signals derived from the low-pass filter 57 and the delay line 71 are obtained from the same picture element in the raster for two successive frames. Referring again to Fig. 4, element 1 in the right-hand top of the drawing is scanned only once a frame, and the movement comparator 73 compares the video intelligence obtained from this element in successive frames and, therefore, determines whether motion has taken place within element 1 from the preceding frame. If there is no difference in video output, then there will be no signal derived from the differential amplifier in the movement comparator 73.

The output of the delay line 71, which consists of the video information to be transmitted to the receiver, is connected to a suitable transmitter 75.

The output from the detail comparator 63 and the movement comparator 73 are fed to a coincidence circuit 77. The coincidence circuit 77 consists essentially of a dual-controlled pentode tube, such as a 6AS6, in which the output from the detail comparator 63 is fed to the control grid while the output of the movement comparator 73 is fed to the suppressor grid of the tube. The control grid of the tube is biased so that the tube is cut off unless there is a signal obtained from the detail comparator 63. The suppressor grid of the tube is biased so that the tube is cut off only if there is a signal from the movement comparator 73. It is, therefore, seen that an output is derived from the coincidence circuit 77 only if there is an output derived from the detail comparator 63 and no output from the movement comparator 73. The signal derived from the coincidence circuit 77 will hereafter be referred to as a composite redundancy signal. If either of the conditions set forth is not met, then there will be no output or composite redundancy signal obtained from the coincidence circuit 77. The existence of a composite redundancy signal output from the coincidence circuit 77 corresponds to a condition of high detail and no movement in the scene scanned by the camera tube 35. The composite redundancy signal from the coincidence circuit 77 is fed to the subcarrier modulator 72 where it is used to modulate the redundancy subcarrier applied to modulator 72 from the phase selecting switch 61. The redundancy subcarrier preferably has a frequency of 4 megacycles per second. The modulated subcarrier is passed by the bandpass filter 74 and is transmitted by the transmitter 75 during the active horizontal scanning time in a compatible manner similar to the color signal presently standardized by the Federal Communications Commission.

In the system of our above-referenced U.S. patent application, Serial No. 490,026, entitled "Image Reproducing Device," now Patent Number 2,921,211, if there was an output from the coincidence circuit, the composite redundancy subcarrier would be transmitted 180° out of phase with respect to the reference burst, and if there was no output from the coincidence circuit, the redundancy subcarrier was transmitted in phase with the reference burst. The redundancy signal was transmitted using a single sideband suppressed carrier. The carrier was located at the upper end of the video channel with its single sideband being lower in frequency. Since a single sideband suppressed carrier was used, the vector representing it rotated in one direction with respect to the reference burst. The velocity of rotation was limited by the frequency band of the single sideband signal. A signal in phase with the reference burst would select the large picture elements at the television receiver while a signal 180° out of phase with the reference would select the small picture elements.

It is advantageous to use a plurality of phase positions for large picture elements or areas and a plurality of phase positions for small picture elements or areas. If, for example, two phase positions are used for each of the large and small picture elements, respectively, then it is only necessary to rotate the vector 90° rather than 180°. This reduces the time required for the transition from one picture element size to another.

Referring to Fig. 1 again, if there is an output from the coincidence circuit 77, the redundancy subcarrier will be transmitted either in phase or 180° out of phase with respect to the reference burst. If there is no output from the coincidence circuit 77, the redundancy subcarrier will be transmitted either 90° out of phase or 270° out of phase with respect to the reference burst. This is accomplished by the subcarrier modulator 72 which includes a phase selecting switch similar to the phase selecting switch 61 which is fed by four 4 megacycle signals having phases of 0°, 90°, 180° and 270° with respect to the 4 megacycle reference burst. The phase selecting switch is controlled by a ring counter such as described at pages of 602–604 of "Waveforms" by Chance, Hughes et al. and published in 1949 by the McGraw-Hill Book Company. The ring counter is triggered by the redundancy signal so as to provide the correct phase which lags the present phase by the least amount. The bandpass filter 74 serves to limit the bandwidth of the phase selecting switch. The output of the bandpass filter 74 is applied to the transmitter 75.

The sync generator 45 provides a horizontal sync pulse of 15,750 cycles per second to the transmitter 75, and this pulse is impressed on the transmitted signal during the horizontal or line retrace period in a conventional manner. The sync generator 45 also provides a vertical sync pulse at the rate of 60 cycles per second to the transmitter 75, and this pulse is impressed on the transmitted signal during the vertical or field retrace period in a conventional manner. The 4 megacycle per second output signal from the phase selecting switch 61 is fed to the transmitter 75 and transmitted as a reference burst on the back porch of the horizontal synchronizing signal in a manner similar to the color burst that is transmitted along with the composite color signal presently standardized by the Federal Communications Commission. The redundancy subcarrier frequency is chosen so that it is an odd multiple of one-half the line scanning frequency or an odd multiple of one-quarter of the line scanning frequency, and the redundancy subcarrier and video informations are interleaved similar to the technique used in the transmission of the composite color signal presently standardized by the Federal Communications Commission. Thus, the highest frequency transmitted will be limited to the redundancy subcarrier frequency of 4 megacycles.

From the preceding description it will be understood that the expression "composite redundancy signal" as used in this specification and claims denotes a composite signal representative of the redundancy along the surface of a picture area and also representative of the redundancies existing between corresponding areas of the picture which are presented in successive frames. It will also be understood that the outputs of the detail comparator 63 and the movement comparator 73 will be signals respectively representative of the redundancies along the surface of a picture area and representative of the redundancies existing between corresponding areas of successive frames. Hence, the outputs of the detail comparator 63 and the movement comparator 73 are redundancy signals, and they are aptly referred to as area and frame redundancy signals respectively.

Referring in detail to Fig. 5, there is shown a block diagram of a suitable receiver in accordance with the present invention. The audio system may be of any suitable type in both receiver and transmitter and is omitted from the drawing to reduce the complexity. The signal transmitted from the transmitting system of Fig. 1 is received by a suitable antenna 78 and applied to a conventional television receiver circuit comprising a radio frequency amplifier, an intermediate frequency amplifier, and a video detector as represented by the block 79.

A sync signal separator 81 recovers the 60 cycle per second sync pulse, the 15,750 cycle per second sync pulse and the 4 megacycle per second burst from the output of the video detector in a conventional manner. The 60 cycle vertical sync pulse and the 15,750 cycle horizontal sync pulse are used to maintain the proper relationships of the vertical and horizontal generators 82 and 83, respectively, which are connected to the vertical and horizontal deflection coils 85 and 86 to deflect the beam of a cathode ray tube 88 in a conventional manner. The cathode ray tube is of suitable type and is conventional with the exception that an auxiliary deflection means 90 is provided.

The 4 megacycle per second signal from the sync separator 81 is used to synchronize a 4 megacycle per second oscillator 92 using the same technique that is used in conventional color television receivers to obtain the color reference signal from the color burst. This 4 megacycle per second signal is applied to a frequency doubler 94 to obtain an 8 megacycle per second signal which is fed to the video sampler switch 96.

The 4 megacycle per second signal from the controlled oscillator 92 is also applied to a frequency multiplier 98 whose output is used to synchronize a deflection generator 100 which is similar to the deflection generator 49 described with reference to Fig. 1. The output waveform of this generator 100 is sinsuoidal and is shown in Fig. 4A. The output of generator 100 is applied to the auxiliary deflection coil 90.

Continuous video information from the video detector of block 79 is amplified by a video amplifier 102 which is connected to an electronic switch 104 and is also amplified by a video amplifier 106 which is connected to another electronic switch 108.

The output from the video detector of block 79 is also passed through the bandpass filter 110 which passes the redundancy subcarrier and its side bands. The output from the bandpass filter 110 is fed to a synchronous demodulator 112 such as described in the article "Theory of Synchronous Demodulator as used in NTSC Color Television Receiver" by D. C. Livingston which appears in the January, 1954, issue of the Proceedings of the Institute of Radio Engineers. The 4 megacycle per second output from the controlled oscillator 92 is fed to the synchronous demodulator 112 to act as a reference signal. A maximum positive or negative voltage output is obtained from the synchronous demodulator 112 if the redundancy subcarrier is in phase or 180° out of phase with respect to the reference burst indicating that small picture elements should be used. An inverter is included in block 112 which inverts the negative outputs and adds them to the positive outputs so as to obtain a maximum positive output if there is a zero or 180° phase difference. A zero output is obtained if the subcarrier and burst are 90° or 270° out of phase.

The output of the synchronous demodulator 112 is fed to a paraphase amplifier 114, such as described in "Electron Tube Circuits" by S. Seely, First Edition, published by McGraw-Hill Book Company. This amplifier provides two outputs which have opposite polarity. One of these outputs is connected to the electronic switch 104 and the other is connected to the electronic switch 108. The electronic switch 104 is connected to the sampler switch 96 which is in turn connected to an adder 116. The electronic switch 108 is also connected to the adder 116. The two outputs from the paraphase amplifier 114 are such that only one of the electronic switches 104 or 108 is closed at any one instant. The redundancy signal, therefore, determines which switch 104 or 108 will be closed at any given instant.

The video sampler switch 96, which is similar to the sampler switch 55 described with reference to Fig. 1, samples the continuous video information obtained from the electronic switch 104 at an 8 megacycle per second rate so as to obtain video information pulses for dot presentation. The output of the adder 116 is applied to the cathode 118 of the cathode ray tube 88.

The image reproduction tube 88 is of conventional type with the exception that an auxiliary coil 90 is provided for adding a vertical sinusoidal undulation wobble to the conventional scan in order to reach the staggered picture elements as shown in Fig. 2.

Fig. 6 is a graphical illustration of a portion of the faceplate of the cathode ray tube 88 divided into a number of picture elements or areas by imaginary vertical and horizontal lines for the purpose of explanation.

In the specific embodiment, 262½ scanning lines 120 and 122 are provided for each field. A 525 line coarse raster is completed in each two fields when utilizing continuous video information fed to the cathode 118 from the electronic switch 108. A 1050 line fine raster is completed every eight fields when utilizing the sampled video information fed to the cathode 118 from the sampler switch 96. When the latter sampled video information is fed to the cathode 118, a dot scan raster is obtained. In the first field, the elements 1, 7, 3, 5, 7, 1, etc. located on line 120 are scanned by the electron beam and the electron beam is gated on at a dot rate in the areas designated 1 by the video information from the sampler switch 96. This area is substantially the same form and duration as that of areas that are excited during succeeding field scans. On the next field scan, the interlacing horizontal scan will scan the areas designated 2 on the line 122, and the beam will be gated on in these areas by the video information from the sampler switch 96. In the third field, the electron beam will again scan the line 120. The phase of the undulation will be shifted so that the peaks and troughs correspond with the number 3 elements and the beam will be gated on in the elements designated 3 by the video information from the sampler switch 96. In a similar manner, the succeeding fields of which there are a total of eight, are scanned to obtain a complete frame in eight fields. In this manner, 600 horizontal picture elements may be resolved, assuming a horizontal dot resolution factor of 0.707 and an 83% active horizontal scanning time.

If it is now assumed that the electronic switch 104 is turned off by means of the paraphase amplifier 114 and the electronic switch 108 is turned on, then the continuous video information from the switch 108 is applied to the cathode 118 of the cathode ray tube 88. In this case, the path of the beam is the same as described previously in relation to the dot scan raster, but the electron beam will be continuously on to excite the elements 1, 7, 3, 5, 7, 1, etc. on line 120, and when scanning line 122, the elements 2, 8, 4, 6, 8, 2, etc. For example, in scanning line 120 in field 1, the electron beam excites all the elements 1, 7, 3, and 5 in that line. In field 2, the electron beam will excite all the elements 2, 8, 4 and 6 in the line 122. In the third field, the electron beam will again excite elements 1, 7, 3 and 5 in the line 120. It is seen, therefore, that the utilization of the continuous video information from the electronic switch 108, there is obtained a raster of 525 scanning lines per frame which are scanned at a rate of two fields per frame and 262½ scanning lines per field.

It is further seen from Fig. 6, that by utilization of the dot system presentation which requires eight fields to complete a frame, there is obtained a large amount of detail definition. This definition in detail is obtained by combining both horizontal and vertical interlace. When utilizing a continuous scan, the resolution is reduced in that there are then 525 scanning lines instead of substantially 1050 vertical elements as in the dot system and also the maximum horizontal resolution is reduced by a factor of two. The utilization of eight fields to provide high definition and detail in the image reproduced may result in some flicker due to the decay time of the present phosphors which decay to substantially zero within the time required to scan two fields. However, the high definition portion of our system will only be utilized in those areas where there is high detail resulting from a difference in the brightness of adjacent picture elements while the continuous scan system will be utilized over the majority of the area of the normal picture where the shades are of low detail. It has also been found that in the presentation of moving objects, it is not necessary to have as good a definition as for a still object due to the physiological factor of the human eye. This feature is incorporated into our invention so that where there is movement in the image or scene being televised, continuous video information is applied to the cathode 118 of the image reproducing tube 88 so that a continuous scan is utilized, regardless of the detail involved.

It is seen from the foregoing explanation that our invention provides improved definition in the present television bandwidth of 4.25 megacycles per second. Our invention allows a 100 percent increase in vertical resolution over conventional systems. This provides a maximum of 1016 horizontal picture elements and 1050 vertical picture elements neglecting retrace time within the standard 4.25 megacycles per second bandwith in a compatible manner.

Fig. 7 illustrates another television transmission system embodying our invention. Many of the elements of this transmission system may be identical to those of Fig. 1. Such elements are, therefore, identified by the same reference numerals and need not be described further.

In conventional black and white television transmissions, the video signal is present in the form of a continuously variable amplitude modulation of the video carrier. In regions of very strong signals, many gray levels can be detected, while in regions of poor signal to noise ratio the number of useful levels is greatly reduced. Consequently, in areas of high signal to noise ratio reception, it is apparent that the television bandwidth is not effectively utilized inasmuch as more gray levels can be detected than would be necessary for the presentation of good quality pictures. The transmission system of Fig. 7 utilizes the available television bandwidth for the conveyance of additional information that is utilized for purposes other than the presentation of black and white pictures.

In the transmission system of Fig. 7, video signal is derived for transmission which may at any instant of time be of only one amplitude level of a certain permissible number of such levels. Of the various quantum levels, a certain number are used to transmit black and white video information. It is apparent that other quantum levels may be utilized for the transmission of other information which may be used for the reduction of the television bandwidth or which may be used to present a high definition image to an observer with an available bandwidth.

In the transmission system of Fig. 7, the same scanning technique as used in the system of Fig. 1 is utilized. A low resolution picture is constructed of large picture elements or areas and conventional interlace is used to display 480 lines of all or part of these elements in 1/30 of a second. Each of these large picture elements is subdivided into four smaller elements to obtain a high definition picture. When high detail is required, only one quarter of each large element is excited in any given field. Thus, a total of eight fields is required to construct a high definition image while only two fields (1/30 of a second) are required to construct the low definition areas of the image. Conventional black and white television receivers will display a given large picture element four times while a high definition television receiver of our invention may be displaying four different brightness values in the four different smaller areas of the same large picture element. Because of this, there may be an undesirable flickering of many of the picture elements or areas on conventional black and white receivers. In order to avoid the above-mentioned flicker, the brightness information in the television transmission system of Fig. 7 is quantized.

Three pieces of information representing respectively, the size of the picture element or dot to be used at the receiver, the average brightness value of the large picture element, and the brightness value of the small picture element which is being scanned at any given instant of time, are derived utilizing appropriate portions of the circuitry described in Fig. 1.

A satisfactory picture can be presented on either a conventional black and white television receiver or the high definition television receiver of our invention by the utilization of five brightness levels. Referring to Fig. 8, in detail, these five brightness levels are defined as black (B), dark gray (DG), medium gray (MG), light gray (LG) and white (W) for purposes of explanation. Assuming a satisfactory signal to noise ratio exists in the received signal, then this ratio will permit the recognition of twenty four voltage steps which are divided into five groups. The number of brightness levels that can be incorporated in a system such as that of Fig. 7 is determined by the signal to noise ratio of the received signal. The five groups are arranged in order of increasing voltage or brightness. Each of the five groups are in turn subdivided with brightness steps so arranged that the average of the small brightness steps approximates the average brightness displayed on a conventional black and white television receiver when it receives a signal in that group amplitude range. Since the conventional black and white receiver will not quantize the incoming signal, the levels designated 2, 9, 16, and 23 are not used. With the quantification arrangement shown in Fig. 8, there will be a significant brightness definition between picture elements belonging to adjacent brightness groups when they are displayed on a conventional black and white television receiver.

Referring again to Fig. 7 in detail, the output of the video amplifier 53, which consists of the brightness values obtained from the sequentially scanned small picture elements, is passed through a low pass filter 130. The low pass filter 130 provides in its output a signal representative of the average brightness value of a plurality of the scanned small picture elements. By having an appropriate high frequency cutoff value for the filter 130, the average brightness value of four adjacent small picture elements or areas can be approximated. The output of the low pass filter 130 is then fed through a delay line 132 to a quantizer 134. The delay line 132 has an exact eight field or $\frac{2}{15}$ of a second delay.

The output of the quantizer 134 is such that the continuously varying video information derived from the scanning of the electron beam of the tube 35, in a manner similar to that as explained with reference to Fig. 1 and Figs. 4A and 4B, is translated into a step-by-step variation. The average brightness value of the four adjacent small picture elements derived from the low pass filter 130 is thus replaced by one of five discrete voltage values corresponding to black, dark gray, medium gray, light gray, and white, as shown in Fig. 9. The output of the quantizer 134 is then fed to an adder 136.

When there is detail and no movement in the scene scanned by the camera tube 35, then the composite redundancy signal derived from the coincidence circuit 77 is fed to an amplitude limiter 138 which provides a fixed voltage of +3 units to the adder 136. This fixed voltage is added to the signal derived from the quantizer 134 in the adder 136 and the output of the adder is fed to an encoder 140. The amplitude limiter 138 is biased so that when there is movement or no detail in the scene scanned by the camera tube 35, then a fixed voltage of a −3 units will be fed to the adder 136.

The output of the delay line 71, consisting of an envelope of sampled video corresponding to the brightness of a single small element or area scanned by the electron beam of the camera tube 35 in the previous frame, is fed to a quantizer 142 which replaces the brightness information of this single small element by one of five discrete voltage values corresponding to black, dark gray, medium gray, light gray, and white, as shown in Fig. 9. The quantizer 142 is similar to the quantizer 134. The output of the quantizer 142 is also fed to the encoder 140.

The output of the encoder 140 is fed through a low pass filter 144 which has a bandpass of 0 to 4 megacycles per second. The output of the low pass filter 144, which consists of the video information to be transmitted to the receiver, is connected to a suitable transmitter 146.

The sync generator 45 provides a horizontal sync pulse of 15,750 cycles per second and a vertical sync pulse of 60 cycles per second and these pulses are impressed on the transmitted signal during the horizontal and vertical retrace periods, respectively. The 4 megacycle per second output signal from the phase selecting switch 61 is fed to the transmitter 146 and is transmitted as a reference burst on the back porch of the horizontal synchronizing signal in a manner similar to that as described heretofore regarding the operation of the transmitting system of Fig. 1.

The details of the quantizers 134 and 142 are not believed necessary, in view of the many published papers and books on quantizer tubes. Fig. 9 represents the desired quantizing characteristic of the quantizers 134 and 142.

Fig. 10 is a detailed showing of a cathode ray tube structure which may be utilized to perform the function of the encoder 140. The cathode ray tube 150 comprises an electron gun 152 having a control electrode 154, and a target electrode 156 composed of a plurality of elements. The number of elements corresponds to the number of brightness steps in which the image to be televised is quantized. The elements are numbered 1, 3, 4, 5, 6, 7, 8, 10, 11, 12, 13, 14, 15, 17, 18, 19, 20, 21, 22 and 24. Each of these elements is connected to a separate tap on a resistor divider network 158, one end of which is connected to a terminal 160, the other end of which is connected to a terminal 162. The terminal 160 is connected to ground potential and the terminal 162 is connected to the low pass filter 144.

The output from the adder 136 is applied to beam deflection plates 164 of the cathode ray tube 150. The output from the quantizer 142 is applied to beam deflection plates 166 of the cathode ray tube 150. The electron gun 152 generates an electron beam which is deflected vertically by the signal applied to the beam deflection plates 166 and is deflected horizontally by the signal applied to the beam deflection plates 164.

Since the scanning technique used in the transmission system of Fig. 1 is again utilized in the transmission system of Fig. 7, a single large element or area of a picture is divided into four smaller parts. If, for purposes of explanation, the brightness represented by these four parts of a large picture element is white, light gray, light gray and black, then the average brightness of the four smaller picture elements will be light gray. In accordance with Fig. 9, a voltage of +1 unit will be fed to the adder 136 from the quantizer 134. At the same time, a voltage of +3 units will be fed to the adder 136 from the amplitude limiter 138. The voltage output of the adder 136 will thus equal +4 units which is fed to the horizontal deflection plates 164 of the cathode ray tube 150. A voltage of +2 units, which corresponds to the small picture element whose brightness is equal to white, is fed to the vertical deflection plates 166 of the cathode ray tube 150. It is thus seen that the electron beam will be deflected to the element designated 22 in Fig. 10. The output of the frequency doubler 59 is applied to the control electrode 154 of the tube 150 to provide beam current at the exact time that the electron beam is directed to the element designated 22 on the target electrode 156. The next small picture element which is scanned has a brightness value equal to light gray. A voltage of +1 unit, which corresponds to the brightness value of that element, is fed to the vertical deflection plates 166 of the tube 150. At the same time, the voltage output of the adder 136, which is equal to +4 units, will be fed to the horizontal deflection plates 164 of the tube 150 and so the electron beam will be deflected to the element designated 21 in Fig. 10. The output of the frequency doubler 59 is applied to the control electrode 154 of the tube 150 to provide beam current at the exact time the electron beam is directed to the element designated 21 on the target electrode 156. In a similar manner, the electron beam will be directed to the element designated 21 for the next small picture element whose brightness value is equal to light gray. The next small picture element which is scanned under the illustrative case has a brightness value equal to black. The voltage of −2 units, which corresponds to the brightness value of that element, is fed to the vertical deflection plates 166 of the tube 150. At the same time, voltage output of the adder 136, which is equal to +4 units, will be fed to the horizontal deflection plates 164 of the tube 150. And so the electron beam will be deflected to the element designated 17 in Fig. 10. The output of the frequency doubler 59 again will be applied to the control electrode 154 of the tube 150 to provide beam current at the exact time that the electron beam is directed to the element designated 17 on the target electrode 156. It is thus seen that the brightness information concerning these four small picture elements will be transmitted in fields 1, 3, 5 and 7 at the levels 22, 21, 21 and 17. On a conventional black and white television receiver, the large picture element will be presented four times, first appearing to be on the light side of light gray, then as light gray, light gray and on the dark side of dark gray.

If the brightness values from four adjacent small picture elements 1, 3, 5 and 7, for instance are identical and it is assumed for purposes of explanation that the average brightness of this group is light gray, then a voltage equal to +1 unit will be fed to the adder 136 from the quantizer 134. At the same time, a voltage equal to −3 units will be fed to the adder 136 from the amplitude limiter 138. The voltage output of the adder 136 will thus equal −2 units which is fed to the horizontal deflection plates 164 of the tube 150. The voltage equal to +1 unit, which corresponds to the brightness value of one of the small picture elements, is fed to the vertical deflection plates 166 of the tube 150. And so the electron beam of the tube 150 will be deflected to the element designated 20 in Fig. 10, and the output of the frequency doubler 59 will be applied to the control electrode 156 of the tube 150 to provide beam current at the exact time the electron beam is directed to the element designated 20. In a similar manner, if there is movement in the scene scanned by the camera tube 35, then a voltage equal to −3 units will be fed to the adder 136 to deflect the electron beam of the tube 150 to elements designated 1, 5, 12, 20 or 24, depending upon the average brightness of a group of small elements or areas.

The corresponding receiver for the transmission system of Fig. 7 is shown in Fig 11. Many of the elements of this receiver may be identical to those of Fig. 5. Such elements are, therefore, identified by the same reference numerals and need not be described further. An image reproduction tube 170 is of conventional type with the exception that means are provided for generating two electron beams of different spot size and means are also provided for adding a high frequency undulation to one of the beams in order to produce a scanning waveform similar to that shown in Fig. 4C. Alternatively, scanning waveforms similar to those shown in Figs. 4A and 4B may be produced by introducing a frequency multiplier in the circuitry before the deflection generator 100, such as shown in Fig. 5. In a specific embodiment, the cathode ray tube 170 is provided with two separate electron guns 172 and 174. It is also possible to utilize a common cathode and obtain two separate beams by use of separate control grids or to utilize only one electron gun with the provision of means for defocusing the beam generated from the single gun to obtain two different spot sizes.

The quantized video information from the video detector of block 79 is amplified by a video amplifier 176 which is connected to a decoder 178. Variable gain tubes are employed in block 79 and are controlled by the signal output from a comparison circuit 177. The comparison circuit 177 is fed sync pulses from the video amplifier 176 and the output from a fixed voltage source 179. The signal output from the circuit 177 is thus a comparison of the level of the sync pulses from the video amplifier 176 with the reference from the fixed voltage source 179. This automatic gain control is required to maintain the correct signal input amplitude to the decoder 178. The 4 megacycle per second signal from the controlled oscillator 92 is applied to the frequency doubler 94 whose output is connected to the decoder 178. The 4 megacycle per second output of the controlled oscillator 92 is also applied to a deflection generator 100. The decoder 178 has two outputs, one is the composite redundancy signal which is fed to a paraphase amplifier 180, which may be similar in type to the amplifier 114 of Fig. 5, and the other is the video information signal which is used to reproduce the televised image on the screen of the cathode ray tube 170.

Fig. 12 is a detailed showing of the cathode ray tube structure which may be utilized to perform the function of the decoder 178. The cathode ray tube 182 comprises an electron gun 184 having a control electrode 186, and a target electrode 188 composed of a plurality of elements. These elements are designated large (L) or small (S), black (B), dark gray (DG), medium gray (MG), light gray (LG), or white (W). Each of the elements designated (L) is connected by a lead 189 which is connected to a terminal 190. The elements designated (S) are interconnected by a lead 191 which is connected to a terminal 192. The terminal 190 is connected to the paraphase amplifier 180 by means of a lead 193. The terminal 192 is connected through resistors 194 and 195 to the lead 193. A connection is made to ground potential at the junction of the resistors 194 and 195. The elements designated (B) are interconnected by a lead 196 which is connected to a point 197 on the voltage divider network 198 comprising the resistors 199, 200, 201 and 202. From the point 197, a connection is made to the terminal 203 which is connected to ground potential. The elements designated (DG) are interconnected by the lead 204 which is connected to a point 205 on the voltage divider network 198. The elements designated (MG) are interconnected by the lead 206 which is connected to a point 207 on the voltage divider network 198. The elements designated (LG) are interconnected by the lead 208 which is connected to a point 209 on the voltage divider network 198. The elements designated (W) are interconnected by the lead 210 which is connected to a point 211 on the voltage divider network 198. The cathode ray tube 182 is also provided with a beam deflection plate 213.

Cathode ray tube 182 differs in one very important respect from the cathode ray tubes of the prior art. This difference is the shape of the electron beam 215. It will be seen from the drawing of Fig. 12 that the electron beam 215 takes the form of a ribbon extending the height of the target electrode 188, and has a width substantially equal to the width of one of the elements designated large, for example. The target electrode 188 in this embodiment is subdivided into 24 areas. The electron gun 184 is designed to shape the beam so that it will impinge on only one of these 24 areas at a given time. It is seen that when the electron beam 215 is directed to area 1, it will impinge on a "large" element and on a "black" element. When the electron beam 215 is directed to area 2, it will impinge on a "small" element and on a "black" element. The detail of the electron gun 184 is not believed necessary, in view of the many published papers on electron guns.

In order to explain the operation of the decoder of Fig. 12, it is assumed that the brightness represented by four parts of a picture element is white, light gray, light gray and black, and that the brightness information concerning these four small picture elements was transmitted in fields 1, 3, 5 and 7 at the levels 22, 21, 21 and 17 as heretofore described with reference to Fig. 7. Further, it is assumed that this quantized brightness information is the signal output of the video amplifier 176 and is applied to the beam deflection plate 213 of the cathode ray tube 182. The electron beam 215 will be directed horizontally first to the area 22 where it will impinge on a small element and a white element, then to the area 21 where it will impinge on a small element and a light gray element, then to area 21 again, and finally to the area 17 where it will impinge on a small element and a black element. The output of the frequency doubler 59 will be applied to the control electrode 186 of the tube 182 to provide beam current at the exact times that the electron beam 215 is directed to the elements located in the areas 22, 21, 21 and 17, respectively. A signal of the voltage value of —4 units will be derived from the white element in the area 22 when the electron beam is deflected to this area and this signal will be applied to the terminal 219. At the same time, the beam will impinge on a small element electrode and lead 193 which is connected to the large element electrodes and to the paraphase amplifier 180 will remain at ground potential. A signal of a voltage value of —3 units will be derived from the light gray element in the area 21 when the electron beam is deflected to this area and this signal will next be applied to the terminal 219 through the resistor 202. At the same time, the beam will impinge on a small element electrode and a ground potential signal will be applied to the paraphase amplifier 180. When the electron beam is deflected to area 17, a signal of zero voltage value will be derived from the black element in this area, and this signal will be applied through the voltage divider network 198 to the terminal 219. At the same time, the beam will impinge on a small element and a ground potential signal will be applied to the paraphase amplifier 180. At the terminal 219 there will appear the signals representative of the brightness values of the four small picture elements or areas. These signals are applied to the cathodes 221 and 223 of the cathode ray tube 170. The voltage signals appearing at the terminal 192 are fed to the paraphase amplifier 180. This amplifier provides two outputs which have opposite polarity. These outputs are connected to the control grids 225 and 227 of the electron guns 172 and 174, respectively. These two outputs from the paraphase amplifier 180 are such that only one electron gun 172 or 174 is gated on at any one time. The signal from the paraphase amplifier 180 determines which electron gun 172 or 174 will be gated on at any given time. When a signal of ground potential value is applied to the paraphase amplifier 180, it produces an output having a polarity so that the electron gun 174 is gated on at this time.

If the brightness represented by the four parts 1, 3, 5 and 7 of a large picture area is identical, and it is assumed for purposes of explanation that the brightness of this group is light gray, and that this brightness information was transmitted at the level 20, then the electron beam 215 will be deflected horizontally to the area 20 where it will impinge on a large element and on a light gray element. A signal of a voltage value of —3 units will be derived from the light gray element in area 20 and this signal will appear at the terminal 219. At the same time, a signal of negative voltage value will be derived from a large element in the area 20 and this signal will be applied to the paraphase amplifier 180 by means of leads 189 and 193. In this case, the output of the paraphase amplifier will be of a polarity so that the electron gun 172 will be gated on at this time.

The image represented by the cathode ray tube 170 may be explained by reference to the graphical representation shown in Fig. 13. As previously explained, the cathode ray tube 170 is provided with two separate electron guns 172 and 174 for producing two electron beam spots of different size. The electron gun 174, which excites the small size picture elements such as represented in the numbered elements in the left hand side of Fig. 13, is provided with an electrostatic deflection system 229 which is energized by the deflection generator 100.

If it is assumed that the small spot electron gun 174 is turned on by the paraphase amplifier 180, then a dot scanning raster is obtained similar to that as explained in the drawing of Fig. 6 heretofore described. If it is assumed that the small beam electron gun is turned off by means of the paraphase amplifier 180 then the large spot electron gun 172 is gated on, the scanning raster is as indicated on the right hand portion of Fig. 13. The electron beam of the large beam spot electron gun 172 is conventionally deflected and is of sufficient size to excite the elements 1, 7, 5, 3 on line 231 and when scanning line 233 the elements 2, 8, 6 and 4. Therefore, it is seen that the beam from the large beam spot electron gun is of sufficient size that an entire large picture area is excited during one cycle of sample video derived from the decoder 178 and that the entire raster is covered in two fields.

From the foregoing description of our invention it will be apparent that the cathode ray tube which forms the subject matter of our copending U.S. patent application 490,026, now Patent Number 2,921,211, previously referred to, may be utilized in the receiving systems described in Figs. 5 and 11. In that event, the screens of the cathode ray tubes 88 and 170 in Figs. 5 and 11, respectively, would be comprised of phosphors having different decay times.

Fig. 14 illustrates a color television transmission system embodying our invention. Many of the elements of the transmission system of Fig. 14 may be similar to those of Figs. 1 and 7. Such elements are, therefore, identified by the same reference numerals and need not be described further.

The system shown in Fig. 14 utilizes the same scanning technique as explained in the description of Figs. 1 and 7. The burst frequency used in this embodiment is equal to 3.58 megacycles, the sampling frequency is equal to 7.16 megacycles and the undulation added to the normal scan is equal to $n$ times 3.58 megacycles. The system of Fig. 14 is further based on the assumption that individual picture areas at the receiver of Fig. 15 will emit light during a large enough percent of the eight field scanning cycle so that flicker will not seriously degrade the reproduced image. At the receiver of Fig. 15, the entire image is reproduced in high definition.

Referring to Fig. 14 in detail, the object 31 to be televised is focused by the optical means 33 onto a half-silvered mirror 230 which passes a portion of the light onto a photosensitive cathode of the camera tube 35. The mirror 230 reflects the remainder of the light from the object 31 onto two dichroic mirrors 232 and 234. The dichroic mirror 232 reflects the blue light to a pickup tube 236 and passes the red and green light. The dichroic mirror 234 reflects the red light to a pickup tube 238 and passes the green light to a pickup tube 240. The electron beams of the pickup tubes 236, 238 and 240 are conventionally deflected by horizontal and vertical deflection coils which are supplied 15,750 cycles per second and 60 cycles per second signals from a sync generator 242. The blue, red and green video signals generated by the tubes 236, 238 and 240, respectively, are fed to a conventional matrix network 244 where they are mixed to form the conventional I and Q color signals. These signals are fed to a conventional color television modulator 246. Modulator 246 is also fed two color subcarriers, both of 3.58 megacycles per second from the sync generator 242. One of the color subcarriers is displaced 90° from the other. The I and Q color signals are applied to modulate the amplitudes of the two color subcarriers. These two subcarriers are combined to have their carriers deleted, and a single chrominance signal, that varies both in amplitude and phase with respect to their original 3.58 megacycle per second subcarrier, is fed through a bandpass filter 252 to the transmitter 248.

The output of the sampler switch 55 is fed through a filter 250, which has a bandpass of 0 to 3.5 megacycles per second, to the transmitter 248. The sync generator 242 also applies a 3.58 megacycle per second signal to the transmitter 248, which signal is transmitted as a reference burst on the back porch of the horizontal synchronizing signal in the conventional manner. The reference burst is needed at the receiver in order to recreate the 3.58 megacycle per second signal and to lock it into phase with the subcarrier at the transmitter.

In Fig. 15 there is illustrated a suitable color television receiver which may be utilized in the practice of our invention. The sync signal separator 81 recovers the 60 cycle per second and the 15,750 cycle per second sync pulses which are applied to the vertical and horizontal generators 82 and 83, respectively. The generators 82 and 83 are connected to the vertical and horizontal deflection coils 85 and 86, respectively, to deflect the beam of the cathode ray tube 260 in a conventional manner. The cathode ray tube 260 in this embodiment is a three-gun shadow-mask type tube and is conventional with the exception that an auxiliary deflection coil 90 is provided. A detailed description of a shadow-mask type for the presentation of color images is found in an article entitled "A Three-Gun Video-Mask Color Kinescope" by H. B. Law, in the October 1951 issue of the proceedings of the IRE, page 1186.

The 3.58 megacycle per second color burst from the sync separator 81 is used to synchronize the oscillator 92 at a frequency of 3.58 megacycles per second. The oscillator 92 feeds and controls blue and red color difference demodulators 262 and 264. The outputs from the blue color and red color difference demodulators 262 and 264 respectively, are applied to a mixer and inverter circuit 266 in order to obtain the green color difference signal, G—Y. The output from the mixer and inverter circuit 266 is fed to a cathode 268 of the cathode ray tube 260. The output from the blue color difference demodulator 262 and the red color difference demodulator 264 is fed to cathodes 270 and 272, respectively, of the cathode ray tube 260.

The output of the oscillator 92 is applied to a frequency doubler 94 to obtain a 7.16 megacycles per second signal which is fed to the sampler switch 96, and is also applied to the frequency multiplier 98 whose output is used to synchronize the deflection generator 100. The output of the generator 100 is applied to the auxiliary deflection coil 90.

The video information from the video detector block 79 is passed through a filter 276 to the sampler switch 96. Filter 276 has a bandpass of 0 to 3.5 megacycles so that much of the color information is not passed to the sampler switch 96. Video information from the video detector of block 79 is also passed through a bandpass filter 278 which passes the chrominance information. The output of the bandpass filter 278 is applied to the blue and red color difference demodulators 262 and 264, respectively.

The sampler switch 96 is connected to the control grids 278, 279 and 280 of the cathode ray tube 260. Sampler switch 96 samples the brightness information from the filter 276 at a 7.16 megacycle rate. The wave shape of the signal at the output of the frequency doubler 94 will be similar to that shown in Fig. 4C except that the signal will have a frequency of 7.16 megacycles per second. The wave shape of the signal at the output of the deflection generator 100 is similar to that shown in Figs. 4A and 4B except that the signal will have a frequency of either 17.9 megacycles or 10.74 megacycles. Either of these frequencies may be chosen and it is seen that they are odd multiples of the color subcarrier frequency.

From the foregoing description it is seen that in Figs. 14 and 15, respectively, there is provided a high definition color television system which is compatible with the present FCC standards for color television. It is also apparent that the scanning technique used at the camera tube 235 of Fig. 14 and the cathode ray tube 260 of Fig. 15 is the same as that used at the camera tube 35 of Figs. 1 and 7.

It is also apparent that a high definition color television system may also be constructed using a high definition and a low definition scan within the television raster. In that event, the color information is transmitted in the manner explained in the description of the system of Fig. 14. Also, a motion and detail analysis of the brightness information is made as explained in the description of the systems of Figs. 1 and 7. In addition, the composite redundancy signal, which is used to tell the receiver whether to use a high definition or low definition scan, is transmitted by quantizing the brightness information as explained in the description of Fig. 7. In this case it will be necessary to separate the frequency bands used for transmitting the color and the quantized brightness informations. This is accomplished by providing a 3 megacycle cutoff frequency in filters 57 (Fig. 7) and 276 (Fig. 5) and a 3.1 to 4.1 megacycle bandpass in filters 252 (Fig. 14) and 278 (Fig. 15). In view of Figs. 1 through 15 and the detailed explanations which have been given previously regarding these figures, it is believed that a drawing and description of an embodiment of such a television transmission system is not believed necessary.

One embodiment of a high definition color television receiving system utilizing a high definition and a low definition scan is shown in Fig. 16. Referring in detail to Fig. 16, the blue color difference signal at the output of the blue color difference demodulator 262 is applied to the cathodes 284 and 286 of a cathode ray tube 288. The cathode ray tube 288 is similar to the cathode ray tube 170 of Fig. 11 except that it has a faceplate 290 upon which is disposed a phosphor layer capable of emitting a blue light when impinged by the electron beam of the tube 288. The quantized brightness information from the decoder 178 is also applied to the cathodes 284 and 286 of the tube 288. As explained in the description concerning Fig. 11, the composite redundancy signal from the decoder 178 is fed to the paraphase amplifier 180 which provides two outputs which have opposite polarities. These outputs are connected to the control grids 292 and 294 of the electron guns 296 and 298, respectively. Therefore, only one electron gun 296 or 298 is gated on at any one time. The electron gun 296 generates an electron beam with a large beam spot which is conventionally deflected by the vertical and horizontal deflection coils 85 and 86, respectively. The electron gun 298 generates an electron beam with a small beam spot which is additionally deflected by an auxiliary deflection system 300 in order for the beam to reach the staggered small picture elements as shown in Fig. 13. Two other cathode ray tubes (not shown in Fig. 16), similar to the cathode ray tube 288 except that one has a faceplate upon which is disposed a phosphor layer capable of emitting red light and the other has a faceplate capable of emitting green light, are also provided in the receiving system. To the red and green cathode ray tubes is applied the output of the decoder 178, the paraphase amplifier 180 and the deflection generator 100. In addition, to the cathodes of the red cathode ray tube is applied the output of the red color difference demodulator 264, and to the cathodes of the green cathode ray tube would be applied the output of the mixer and inverter circuit 266. The images from the blue cathode ray tube 288 and the red and green cathode ray tubes are then superimposed to form a single composite color image.

It will be obvious to those skilled in the art that a single cathode ray tube may be utilized in place of the three cathode ray tubes in the embodiment in Fig. 16. In that event, an auxiliary electromagnetic deflection coil may be positioned on the neck of the cathode ray tube in order to undulate the electron beam of the tube in order for it to reach the desired small picture elements when the small spot size electron gun is energized. The large size spot electron beam would also be undulated in this case, but this undulation may be neglected or corrected by adding a correcting undulation during the time that the large spot gun is energized. The single cathode ray tube in this case may be a color television reproducing tube of the shadow-mask type.

It will also be obvious to those skilled in the art that where an image is to be reproduced in color or where long and short decay phosphors are to be utilized at the receiver, the image reproducing tube may take the form of any tube utilized in color image presentation without departing from the spirit and teachings of our invention.

It will also be understood that the video information concerning the picture elements or areas may be formed using a scanning technique other than a sinusoidal-trajectory of the electron scanning beam. A square or crenelate, a zigzag, an oblique trajectory, or the addition of an harmonic of the fundamental sinusoidal frequency may be utilized without departing from the scope of this invention.

Our invention was described in an embodiment wherein an analysis or comparison of the redundancies along the surface of a picture area and the redundancies of corresponding areas in successive frames of the picture was made at the transmitter. It will be understood that such an analysis may be made at the receiver without departing from the scope of this invention.

While we have shown our invention in several forms, it will be obvious to those skilled in the art that it is not so limited, but is susceptible of various other changes and modifications without departing from the spirit and scope thereof.

We claim as our invention:

1. A television transmitting system comprising means for forming video signals resulting from scanning a plurality of picture areas located in different horizontal lines of a picture, first means coupled to said forming means for comparing the amplitudes of a plurality of said video signals formed within a given frame time to develop an area control signal whenever there exists a difference in said amplitudes, second means for comparing the amplitude of one of said video signals formed within said given frame time with one of said video signals formed within a former frame time to develop a frame control signal whenever there exists a difference between the amplitudes of said last mentioned video signals, means for replacing said video signals formed during a given time interval by one of a predetermined number of discrete value signals which most nearly corresponds to the average amplitude of the video signals formed during said time interval, means coupled to said first and second means for producing an area selection signal indicative of the development of said area control signal and an absence of the development of said frame control signal, and means for transmitting said discrete value signals and said area selection signal as a composite television signal within a predetermined frequency band.

2. A television transmitting system comprising means for forming video signals resulting from scanning a plurality of picture areas located in different horizontal lines of a picture, first means coupled to said signal forming means for comparing the amplitudes of each of said video signals with the amplitude of a video signal representative of an earlier scanned picture area and formed within a given frame time to develop an area control signal whenever there exists a difference in said amplitudes, second means for comparing the amplitudes of each of said video signals with the amplitudes of a video signal formed within a former frame time to develop a frame control signal whenever there exists a difference in said latter amplitudes, means for replacing said video signals formed during a given time interval by one of a predetermined number of discrete value signals which most nearly corresponds to the average amplitude of the video signals formed during said time intervals, means coupled to said first and second means for producing an area selection signal indicative of the development of said area control signal and an absence of the development of said frame control signal, and means for transmitting said discrete value signals and said area selection signal as a composite television signal within a predetermined frequency band.

3. A television system comprising means for forming video signals resulting from scanning a plurality of picture areas located in different horizontal lines of a picture, first means coupled to said signal forming means for comparing the amplitudes of a plurality of said video signals formed within a given frame time to develop an area control signal whenever there exists a difference in said amplitudes, second means coupled to said signal forming means for comparing the amplitudes of one of said signals formed within said given frame time with the amplitudes of one of said signals formed within a former frame time to develop a frame control signal whenever there exists a difference in said latter amplitudes, means for replacing said video signals formed during a given time interval by one of a predetermined number of discrete value signals which most nearly corresponds to the average amplitude of the video signals formed during said time interval, means coupled to said first and second means responsive to the simultaneous presence and absence respectively of said area and frame control signals respectively for producing an area selection signal, means for coding all said discrete value signals and said area selection signal, means for transmitting said coded signals and said area selection signal as a composite signal, means for receiving said composite signal, said receiving means including an image producing device adapted to produce an image in response to energization of an intensity control electrode thereof, means for recovering said discrete value signals and said area selection signal, means coupled to said signal recovering means for impressing said discrete value signals on said intensity control electrode, and means responsive to said area selection signal to vary the definition of selected areas of a produced image.

4. A television transmitting system comprising means for forming video signals resulting from scanning a plurality of picture areas located in different horizontal lines of a picture, first means for comparing the amplitudes of a plurality of said video signals formed within a given frame time to develop an area control signal whenever there exists a difference in said amplitudes, second means for comparing one of said video signals formed within said given frame time with one of said video signals formed within a former frame time to develop a frame control signal whenever there exists a difference between the video signal formed within said given frame time and the video signal formed within said former frame time, means for modulating said video signals on a carrier wave to produce sideband signals lying within a predetermined frequency band, means for modulating said area selection signal on a subcarrier wave to produce a composite sideband control signal lying within said predetermined frequency band, means for additionally modulating said sideband area selection signal on said carrier wave, and means for transmitting said carrier wave and all of said sideband signals within said band as a composite television signal.

5. A television transmitting system comprising means for forming video signals resulting from scanning a plurality of picture areas located in different horizontal lines of a picture, means for replacing video signals formed during a given time by one of a predetermined number of discrete value signals corresponding to the average value of said video signals, means for replacing one of said video signals formed during said given time by one of another predetermined number of discrete value signals corresponding to the value of said one video signal, first means for comparing the amplitudes of video signals formed during said given time to develop a first control signal whenever there exists a difference in said amplitudes, second means coupled to said signal forming means for comparing the amplitude of said one of the video signals formed during said given time with the amplitude of one of said video signals formed during a former time to develop a second control signal whenever there exists a difference in said latter amplitudes, means coupled to said first and second means responsive to the simultaneous presence and absence respectively of said first and second control signals respectively for producing an area selection signal, means for coding all of said discrete value signals and said area selection signal, and means coupled to said coding means for transmitting said coded signals as a composite television signal within a predetermined frequency band.

6. A television transmitting system comprising means for forming video signals resulting from scanning a plurality of picture areas located in different horizontal lines of a picture, means for replacing video signals formed within a given frame time by one of a predetermined number of discrete value signals corresponding to the average brightness value of said video signals, means for replacing one of said video signals formed within said given frame time by one of another predetermined number of discrete value signals corresponding to the brightness value of said one video signal, first means coupled to said signal forming means for comparing the amplitudes of video signals representative of different picture areas and formed within said given frame time to develop an area control signal whenever there exists a difference in said amplitudes, second means coupled to said signal forming means for comparing the amplitude of said one of the video signals formed within said given frame time with the amplitude of one of said video signals formed within a former frame time to develop a frame control signal whenever there exists a difference in said latter amplitudes, means coupled to said first and second means responsive to the simultaneous presence and absence respectively of said area and frame control signals respectively for producing an area selection signal, said last-named means including means for limiting said area selection signal to a designated value, means for coding said discrete value signals and said area selection signal, and means coupled to said coding means for transmitting said coded signals as a composite television signal within a predetermined frequency band.

7. A television system comprising means for forming video signals resulting from scanning a plurality of picture areas located in different horizontal lines of a picture, means for replacing said video signals formed during a given time by one of a predetermined number of discrete value signals corresponding to the average value of said video signals, means for replacing one of said video signals formed during said given time by one of another predetermined number of discrete value signals corresponding to the value of said one video signal, first means coupled to said signal forming means for comparing the amplitudes of video signals representative of different picture areas and formed during said given time to develop a first control signal whenever there exists a difference in said amplitudes, second means coupled to said signal forming means for comparing the amplitude of said one of the video signals formed during said given time with the amplitude of one of said video signals forming during a former frame time to develop a second control signal whenever there exists a difference in said latter amplitudes, means coupled to said first and second means responsive to the simultaneous presence and absence respectively of said first and second control signals respectively for producing an area selection signal, means for coding said discrete value signals and said composite control signal, means coupled to said coding means for transmitting said coded signals as a composite television signal, means for receiving said composite television signal, said receiving means including an image reproducing device adapted to produce an image in response to the energization of an intensity control electrode thereof, means for recovering said coded signals, means for decoding said coded signals to produce said discrete value signals and said area selection signal, means for impressing said discrete value signals on said intensity control electrode, and means responsive to said composite control signal to vary the definition of selected areas of a produced image.

8. A television system comprising means for forming video signals resulting from scanning a plurality of picture areas located in different horizontal lines of a picture, means for replacing said video signals formed during a given time by one of a predetermined number of discrete value signals which most nearly corresponds to the average amplitude of the video signal formed during said given time, means for replacing one of said video signals formed during said given time by one of another predetermined number of discrete value signals corresponding to the average amplitude during said given time of said one video signal, means for comparing the amplitudes of video signals formed during said given time to develop a control signal whenever there exists a difference in said amplitudes, means for coding said discrete value signals and said control signal, means coupled to said coding means for transmitting said coded signals as a composite television signal, means for receiving said composite television signal, said receiving means including a cathode ray means adapted to produce an image in response to energization of an intensity control electrode thereof, means for recovering said coded signals, means for decoding said coded signals to produce said discrete value signals and said control signal, means for impressing said discrete value signals on said intensity control electrode, and means responsive to said control signal to vary the definition of selected areas of a produced image.

9. A color television transmitting system comprising means for forming video signals resulting from scanning a plurality of picture areas located in different horizontal lines of a colored picture, means for replacing the brightness portion of each of said video signal formed during a given time by one of a predetermined number of discrete value signals which most nearly corresponds to the average amplitude of the video signal formed during said given time, means for replacing the brightness portion of one of said video signals formed during said given time by one of another predetermined number of discrete value signals corresponding to the average amplitude during said given time of said one video signal, means for comparing the amplitudes of the brightness portion of said video signals formed during said given time to develop a control signal whenever there exists a difference in said amplitudes, means for coding said discrete value signals and said control signal, and means coupled to said coding menas for transmitting said coded signals and the portions of said video signals representing color information as a composite television signal.

10. A color television system comprising means for forming video signals resulting from scanning a plurality of picture areas located in different horizontal lines of a colored picture, means for replacing the brightness portion of each of said video signals formed during a given time by one of a predetermined number of discrete value signals which most nearly corresponds to the average amplitude of the video signal formed during said given time, means for replacing the brightness portion of one of said video signals formed during said given time by one of another predetermined number of discrete value signals corresponding to the average amplitude during said given time of said video signal, means for comparing the amplitudes of the brightness portion of said video signals formed during said given time to develop a control signal, means for coding said discrete value signals and said control signal, means coupled to said coding means for transmitting said coded signals and the portions of said video signals representing primary color information as a composite television signal, means for receiving said composite television signal, said receiving means including a plurality of cathode ray means each adapted to produce an image in response to energization of an electron gun thereof, means for recovering said coded signals and the portions of said video signals representing primary color information, means for decoding said coded signals to produce said discrete value signals and said redundancy signal, means for impressing said discrete value signals on each of said electron guns, means for impressing the portions of said video signals corresponding to information of one primary color on one of said electron guns, means for impressing the portions of said video signals corresponding to information of another primary color on another of said electron guns, means for impressing the portions of said video signals corresponding to information of another primary color on another of said electron guns, and means responsive to said control signal to vary the definition of selected areas of each produced image.

11. A television transmitting system comprising means for forming video signals resulting from scanning a plurality of picture areas of a scene, means for replacing said video signals formed during a given time by one of a predetermined number of discrete value signals which most nearly corresponds to the average amplitude of the video signal formed during said given time, means for replacing one of said video signals formed during said given time by one of another predetermined number of discrete value signals corresponding to the average amplitude during said given time of said one video signal, means for coding all of said discrete value signals, and means coupled to said coding means for transmitting said coded discrete value signals as a composite television signal within a predetermined frequency band.

References Cited in the file of this patent

UNITED STATES PATENTS

| | | |
|---|---|---|
| 2,321,611 | Moynihan | June 15, 1943 |
| 2,479,880 | Toulon | Aug. 23, 1949 |
| 2,516,587 | Peterson | July 25, 1950 |
| 2,623,196 | Toulon | Dec. 23, 1952 |
| 2,629,010 | Graham | Feb. 17, 1953 |
| 2,676,200 | Sziklai | Apr. 20, 1954 |
| 2,784,256 | Cherry | Mar. 5, 1957 |

OTHER REFERENCES

Application of Toulon, Ser. No. 289,263, filed May 22, 1952.